US012785076B2

(12) United States Patent
Yubuchi et al.

(10) Patent No.: US 12,785,076 B2
(45) Date of Patent: Nov. 3, 2026

(54) POSITIVE ELECTRODE MIXTURE, LITHIUM-ION BATTERY, AND MANUFACTURING METHOD FOR LITHIUM-ION BATTERY

(71) Applicant: TOYOTA JIDOSHA KABUSHIKI KAISHA, Toyota (JP)

(72) Inventors: So Yubuchi, Sunto-gun (JP); Jun Yoshida, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 422 days.

(21) Appl. No.: 18/609,200

(22) Filed: Mar. 19, 2024

(65) Prior Publication Data

US 2024/0339592 A1 Oct. 10, 2024

(30) Foreign Application Priority Data

Apr. 4, 2023 (JP) ................................ 2023-060793

(51) Int. Cl.
*H01M 4/36* (2006.01)
*H01M 4/02* (2006.01)
(Continued)

(52) U.S. Cl.
CPC ...... *H01M 4/364* (2013.01); *H01M 2004/021* (2013.01); *H01M 2004/028* (2013.01); *H01M 10/0525* (2013.01); *H01M 10/0562* (2013.01)

(58) Field of Classification Search
CPC ............ H01M 4/364; H01M 10/0525; H01M 10/0562; H01M 2004/021; H01M 2004/028; H01M 4/505; H01M 4/525; H01M 4/131; H01M 4/485; H01M 10/058; Y02E 60/10
See application file for complete search history.

(56) References Cited

U.S. PATENT DOCUMENTS

2022/0173431 A1 6/2022 Matsuyama
2023/0402600 A1* 12/2023 Yubuchi ................ C01G 53/50
(Continued)

FOREIGN PATENT DOCUMENTS

CN 115472798 A * 12/2022 ............ C01G 53/42
CN 115516703 A * 12/2022 ........... C08J 7/0427
(Continued)

*Primary Examiner* — Kaity V Chandler
(74) *Attorney, Agent, or Firm* — Oliff PLC

(57) ABSTRACT

Disclosed is a technique that can improve capacity of a positive electrode active material having an O2-type structure when applied to a positive electrode active material layer of a lithium-ion battery. The positive electrode mixture of the present disclosure comprises a first active material and a second active material, the first active material has an O2-type structure and is plate-like, the second active material has an O2-type structure and is spherical, a ratio $D_{1L}/D_2$ of a long diameter $D_{1L}$ of the first active material to a diameter $D_2$ of the second active material is 0.1 or greater and 1.5 or less, and a ratio of the first active material relative to a total of the first active material and the second active material is 10% by mass or greater and 90% by mass or less.

7 Claims, 10 Drawing Sheets

1

(51) Int. Cl.
*H01M 10/0525* (2010.01)
*H01M 10/0562* (2010.01)

(56) References Cited

U.S. PATENT DOCUMENTS

| | | | | |
|---|---|---|---|---|
| 2023/0402601 | A1* | 12/2023 | Yamazaki | H01M 10/052 |
| 2024/0030484 | A1* | 1/2024 | Vanaphuti | H01M 4/505 |
| 2024/0047751 | A1* | 2/2024 | Ogita | H01M 10/0525 |
| 2024/0063387 | A1* | 2/2024 | Yamazaki | C01G 51/42 |
| 2024/0088377 | A1* | 3/2024 | Tokuda | H01M 4/049 |

FOREIGN PATENT DOCUMENTS

| | | | | | |
|---|---|---|---|---|---|
| CN | 117023652 | A | * | 11/2023 | H01M 4/525 |
| CN | 117594784 | A | * | 2/2024 | H01M 4/525 |
| CN | 117673343 | A | * | 3/2024 | C01G 53/50 |
| JP | 2019-169365 | A | | 10/2019 | |
| JP | 2022-085829 | A | | 6/2022 | |
| JP | 2023090272 | A | * | 6/2023 | H01M 4/505 |
| JP | 2023166220 | A | * | 11/2023 | H01M 4/525 |
| WO | WO-2020261040 | A1 | * | 12/2020 | H01M 10/0525 |
| WO | WO-2024009303 | A2 | * | 1/2024 | H01M 10/4235 |

* cited by examiner

POSITIVE ELECTRODE MIXTURE, LITHIUM-ION BATTERY, AND MANUFACTURING METHOD FOR LITHIUM-ION BATTERY

FIELD

The present application discloses a positive electrode mixture, a lithium-ion battery, and a manufacturing method for a lithium-ion battery.

BACKGROUND

Positive electrode active materials having an O2-type structure as positive electrode active materials of lithium-ion batteries are known. As disclosed in PTL 1, a positive electrode active material having an O2-type structure can be obtained by ion exchange of at least a portion of Na in a Na-containing transition metal oxide having a P2-type structure with Li.

CITATION LIST

Patent Literature

[PTL 1] Japanese Unexamined Patent Publication No. 2019-169365

SUMMARY

Technical Problem

Positive electrode active materials having an O2-type structure have room for improvement in terms of capacity when applied to positive electrode active material layers of lithium-ion batteries.

Solution to Problem

The present application discloses the following plurality of aspects as means for solving the above problem.

<Aspect 1>

A positive electrode mixture, comprising a first active material and a second active material, wherein the first active material has an O2-type structure and is plate-like, the second active material has an O2-type structure and is spherical, a ratio $D_{1L}/D_2$ of a long diameter $D_{1L}$ of the first active material to a diameter $D_2$ of the second active material is 0.1 or greater and 1.5 or less, and a ratio of the first active material relative to a total of the first active material and the second active material is 10% by mass or greater and 90% by mass or less.

<Aspect 2>

The positive electrode mixture according to Aspect 1, wherein a surface of the second active material comprises a plurality of crystallites.

<Aspect 3>

The positive electrode mixture according to Aspect 1 or 2, comprising a solid electrolyte.

<Aspect 4>

The positive electrode mixture according to any of Aspects 1 to 3, comprising one or both of a conductive aid and a binder.

<Aspect 5>

A lithium-ion battery, comprising a positive electrode active material layer, an electrolyte layer, and a negative electrode active material layer, wherein the positive electrode active material layer comprises the positive electrode mixture according to any of Aspects 1 to 4.

<Aspect 6>

The lithium-ion battery according to Aspect 5, wherein one or both of the electrolyte layer and the negative electrode active material layer comprise a solid electrolyte.

<Aspect 7>

A manufacturing method for a lithium-ion battery, comprising using the positive electrode mixture according to any of Aspects 1 to 4 to obtain a positive electrode active material layer, and using the positive electrode active material layer, an electrolyte layer, and a negative electrode active material layer to obtain a lithium-ion battery.

[Effects]

The positive electrode mixture of the present disclosure is used to configure a positive electrode active material layer of a lithium-ion battery, whereby capacity of the lithium-ion battery is easily improved.

DESCRIPTION OF EMBODIMENTS

1. Positive Electrode Mixture

Figure 1:
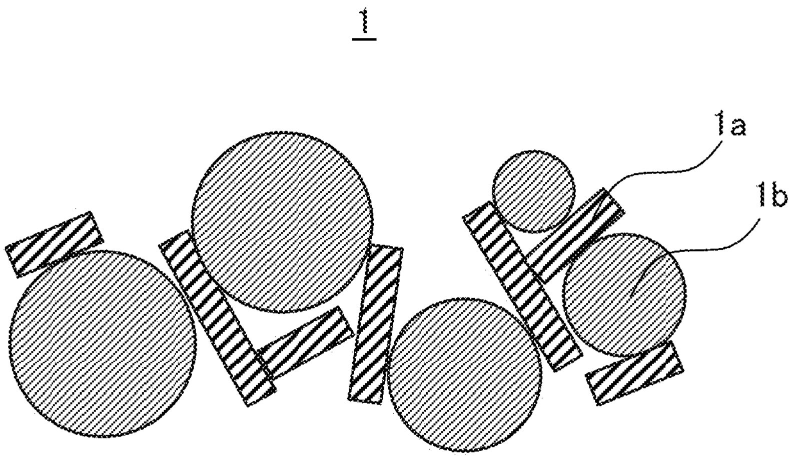
FIG. 1 schematically shows a first active material and a second active material contained in the positive electrode mixture of the present disclosure.

FIG. 1 shows a positive electrode mixture 1 according to one embodiment. The positive electrode mixture 1 comprises a first active material 1*a* and a second active material 1*b*. The first active material 1*a* has an O2-type structure and is plate-like. The second active material 1*b* has an O2-type structure and is spherical. A ratio $D_{1L}/D_2$ of a long diameter $D_{1L}$ of the first active material 1*a* to a diameter $D_2$ of the second active material 1*b* is 0.1 or greater and 1.5 or less. A ratio of the first active material 1*a* relative to a total of the first active material 1*a* and the second active material 1*b* is 10% by mass or greater and 90% by mass or less.

1.1 First Active Material

The first active material 1*a* has an O2-type structure and is plate-like.

1.1.1 Crystal Structure of First Active Material

The first active material 1*a* has at least an O2-type structure (belonging to space group P63mc) as a crystal structure. The first active material 1*a* may have a crystal structure other than an O2-type structure, in addition to having an O2-type structure. Examples of the crystal structure other than an O2-type structure include a T #2-type structure (belonging to space group Cmca) and an O6-type structure (belonging to space group R-3m, with a c-axis length of 2.5 nm or more and 3.5 nm or less, typically 2.9 nm or more and 3.0 nm or less, and differing from an O3-type structure belonging to the same space group R-3m), formed when Li is deintercalated from an O2-type structure. The first active material 1*a* may have an O2-type structure as the main phase or may have a crystal structure other than an O2-type structure as the main phase. In the first active material 1*a*, a crystal structure constituting the main phase can change depending on the charging-discharging state.

The first active material 1*a* may be a single crystal consisting of one crystallite, or may be a polycrystal comprising a plurality of crystallites.

1.1.2 Chemical Composition of First Active Material

The chemical composition of the first active material 1*a* is not particularly limited as long as an O2-type structure is maintained. The first active material 1*a* may at least comprise at least one transition metal element among Mn, Ni, and Co; Li; and O as constituent elements. Particularly, when the constituent elements at least include Li, Mn, at least one of Ni and Co, and O, especially when the constituent elements at least include Li, Mn, Ni, Co, and O, higher performance is easily obtained. However, in the first active material 1*a*, for example, Li can be released due to charging, and the amount of Li present can become close to 0.

The first active material 1*a* may have a chemical composition represented by $Li_aNa_bMn_{x-p}Ni_{y-q}Co_{z-r}M_{p+q+r}O_2$, where $0<a\leq1.00$, $0\leq b\leq0.20$, $x+y+z=1$, and $0\leq p+q+r\leq0.15$. In addition, M is at least one element selected from B, Mg, Al, K, Ca, Ti, V, Cr, Fe, Cu, Zn, Ga, Ge, Sr, Y, Zr, Nb, Mo, and W. When the first active material 1*a* has such a chemical composition, an O2-type structure is more easily maintained.

In the above chemical composition, a may be greater than 0, 0.10 or greater, 0.20 or greater, 0.30 or greater, 0.40 or greater, 0.50 or greater, or 0.60 or greater, and may be 1.00 or less, 0.90 or less, 0.80 or less, or 0.70 or less. In the above chemical composition, b may be 0 or greater, 0.01 or greater, 0.02 or greater, or 0.03 or greater, and may be 0.20 or less, 0.15 or less, or 0.10 or less. In the above chemical composition, x may be 0 or greater, 0.10 or greater, 0.20 or greater, 0.30 or greater, 0.40 or greater, or 0.50 or greater, and may be 1.00 or less, 0.90 or less, 0.80 or less, 0.70 or less, 0.60 or less, or 0.50 or less. In the above chemical composition, y may be 0 or greater, 0.10 or greater, or 0.20 or greater, and may be 1.00 or less, 0.90 or less, 0.80 or less, 0.70 or less, 0.60 or less, 0.50 or less, 0.40 or less, 0.30 or less, or 0.20 or less. In the above chemical composition, z may be 0 or greater, 0.10 or greater, 0.20 or greater, or 0.30 or greater, and may be 1.00 or less, 0.90 or less, 0.80 or less, 0.70 or less, 0.60 or less, 0.50 or less, 0.40 or less, or 0.30 or less. Many types of M make a small contribution towards charging-discharging. In this regard, by having p+q+r at 0.15 or less, a high charging-discharging capacity is easily ensured. p+q+r may be 0.10 or less, or may be 0. The composition of O is approximately 2, but is variable without being limited to exactly 2.0.

1.1.3 Shape of First Active Material

Figure 2:
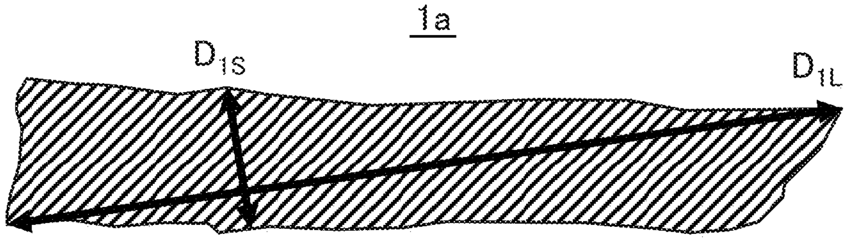
FIG. 2 is a schematic drawing for explaining a long diameter and a short diameter of the first active material.

As shown in FIG. 1, the first active material 1*a* is plate-like. Whether or not an active material contained in the positive electrode mixture 1 is "plate-like" is determined by forming a positive electrode active material layer 20 described below using the positive electrode mixture 1 and observing a cross-section along the thickness direction of the positive electrode active material layer 20 with a scanning electron microscope (SEM), a transmission electron microscope (TEM), or an optical microscope. In the cross-section, when the active material has a long diameter $D_{1L}$ and a short diameter $D_{1S}$ and an aspect ratio (long diameter $D_{1L}$/short diameter $D_{1S}$) of the long diameter to the short diameter of 2 or greater, the active material is regarded as plate-like. As shown in FIG. 2, a long diameter $D_{1L}$ of the first active material 1*a* refers to the maximum length from one point to another point on the surface of the first active material 1*a* in a cross-sectional shape of the first active material 1*a*, and a short diameter $D_{1S}$ of the first active material 1*a* refers to the maximum length of a straight line perpendicular to the long diameter $D_{1L}$ in the cross-sectional shape of the first active material 1*a*, the straight line extending from one point to another point on the surface of the first active material 1*a*. The plate-like first active material 1*a* is not limited to having a constant thickness, and the thickness may vary from portion to portion. Further, the plate-like first active material 1*a* is not limited to being planar, and may have curves and distortions.

1.1.4 Size of First Active Material

The long diameter $D_{1L}$ of the first active material 1*a*, for example, may be 0.3 μm or more and 8.0 μm or less, may be 0.5 μm or more and 6.0 μm or less, or may be 1.0 μm or more and 4.0 μm or less. The short diameter $D_{1S}$ of the first active material 1*a*, for example, may be 0.1 μm or more and 4.0 μm or less, may be 0.3 μm or more and 3.0 μm or less, or may be 0.5 μm or more or 2.0 μm or less. When the positive electrode mixture 1 comprises a plurality of first active materials 1*a*, the long diameter $D_{1L}$ of the first active materials 1*a* is a number average value of all long diameters of the first active materials 1*a* contained in the positive electrode mixture 1, and the short diameter $D_{1S}$ is a number average value of all short diameters of the first active materials 1*a* contained in the positive electrode mixture 1.

1.2 Second Active Material

The second active material 1*b* has an O2-type structure and is spherical.

1.2.1 Crystal Structure of Second Active Material

The second active material 1*b* has at least an O2-type structure (belonging to space group P63mc) as a crystal structure. The second active material 1*b* may have a crystal structure other than an O2-type structure, in addition to having an O2-type structure. Examples of the crystal structure other than an O2-type structure include a T #2-type structure (belonging to space group Cmca) and an O6-type structure (belonging to space group R-3m, with a c-axis length of 2.5 nm or more and 3.5 nm or less, typically 2.9 nm or more and 3.0 nm or less, and differing from an O3-type structure belonging to the same space group R-3m), formed when Li is deintercalated from an O2-type structure. The second active material 1*b* may have an O2-type structure as the main phase or may have a crystal structure other than an O2-type structure as the main phase. In the second active material 1*b*, a crystal structure constituting the main phase can change depending on the charging-discharging state.

The second active material 1*b* may be a single crystal consisting of one crystallite, or may be a polycrystal comprising a plurality of crystallites. A surface of the second active material 1*b* may comprise a plurality of crystallites. When the surface of the second active material 1*b* comprises a plurality of crystallites, crystal grain boundaries are present on the surface of the second active material 1*b*. The crystal grain boundaries may become entrances and exits for intercalation. Specifically, when the second active material 1*b* comprises a plurality of crystallites on the surface thereof, expected effects include a decrease in reaction resistance due to the increased number of intercalation entrances and exits, a decrease in diffusion resistance due to shortened migration distance of lithium ions, and prevention of cracking due to a decrease in absolute quantities of expansion and contraction amounts during charging-discharging.

The size of the crystallites constituting the second active material 1*b* may be large or small. However, the smaller the size of the crystallites, the more crystal grain boundaries there are, and the more easily the above advantageous effects are exhibited. For example, when the diameter of crystallites constituting the second active material 1*b* is less than 1 μm, higher performance is easily obtained. Note that "crystallite" and "diameter of crystallite" can be determined by observing the surface of the positive electrode active material particle with a scanning electron microscope (SEM) or a transmission electron microscope (TEM). Specifically, when the surface of the second active material 1*b* is observed and one closed region surrounded by crystal grain boundaries is observed, the region is regarded as a "crystallite". The maximum Feret diameter of the crystallite is determined, and this is regarded as the "diameter of the crystallite". If the particle consists of a single crystal, the particle itself is considered as one crystallite, and the maximum Feret diameter of the particle is the "diameter of the crystallite". Alternatively, the diameter of crystallites can be determined by EBSD or XRD. For example, the diameter of crystallite can be determined based on the Scherrer equation from the half-width of the diffraction line of the XRD pattern. When the diameter of the crystallite in the second active material 1*b* specified by any of the methods is less than 1 μm, higher performance is easily obtained.

The crystallite of the second active material 1*b* may have a first surface exposed on the particle surface, and the first surface may be planar. The surface of the second active material 1*b* may have a structure in which a plurality of planes are connected. When manufacturing the second active material 1*b*, crystallites having a planar first surface are easily obtained by growing crystallites on the surface of the particle until one crystallite and another crystallite are connected to each other.

1.2.2 Chemical Composition of Second Active Material

The chemical composition of the second active material 1*b* is not particularly limited as long as an O2-type structure is maintained. The chemical composition of the second active material 1*b* may be the same as the chemical composition of the first active material 1*a*, or may be different therefrom. The second active material 1*b* may at least comprise at least one transition metal element among Mn, Ni, and Co; Li; and O as constituent elements. Particularly, when the constituent elements at least include Li, Mn, at least one of Ni and Co, and O, especially when the constituent elements at least include Li, Mn, Ni, Co, and O, higher performance is easily obtained. However, in the second active material 1*b*, for example, Li may be released due to charging, and the amount of Li present can become close to 0.

The second active material 1*b* may have a chemical composition represented by $Li_aNa_bMn_{x-p}Ni_{y-q}Co_{z-r}M_{p+q+r}O_2$, where $0<a\leq 1.00$, $0\leq b\leq 0.20$, $x+y+z=1$, and $0\leq p+q+r\leq 0.15$. In addition, M is at least one element selected from B, Mg, Al, K, Ca, Ti, V, Cr, Fe, Cu, Zn, Ga, Ge, Sr, Y, Zr, Nb, Mo, and W. When the second active material 1*b* has such a chemical composition, an O2-type structure is more easily maintained.

In the above chemical composition, a may be greater than 0, 0.10 or greater, 0.20 or greater, 0.30 or greater, 0.40 or greater, 0.50 or greater, or 0.60 or greater, and may be 1.00 or less, 0.90 or less, 0.80 or less, or 0.70 or less. In the above chemical composition, b may be 0 or greater, 0.01 or greater, 0.02 or greater, or 0.03 or greater, and may be 0.20 or less, 0.15 or less, or 0.10 or less. In the above chemical composition, x may be 0 or greater, 0.10 or greater, 0.20 or greater, 0.30 or greater, 0.40 or greater, or 0.50 or greater, and may be 1.00 or less, 0.90 or less, 0.80 or less, 0.70 or less, 0.60 or less, or 0.50 or less. In the above chemical composition, y may be 0 or greater, 0.10 or greater, or 0.20 or greater, and may be 1.00 or less, 0.90 or less, 0.80 or less, 0.70 or less, 0.60 or less, 0.50 or less, 0.40 or less, 0.30 or less, or 0.20 or less. In the above chemical composition, z may be 0 or greater, 0.10 or greater, 0.20 or greater, or 0.30 or greater, and may be 1.00 or less, 0.90 or less, 0.80 or less, 0.70 or less, 0.60 or less, 0.50 or less, 0.40 or less, or 0.30 or less. Many types of M make a small contribution towards charging-discharging. In this regard, by having p+q+r at 0.15 or less, a high charging-discharging capacity is easily ensured. p+q+r may be 0.10 or less, or may be 0. The composition of O is approximately 2, but is variable without being limited to exactly 2.0.

1.2.3 Shape of Second Active Material

The second active material 1*b* is spherical. "Spherical" means having a circularity of 0.80 or greater. The circularity of the active material may be 0.81 or greater, 0.82 or greater, 0.83 or greater, 0.84 or greater, 0.85 or greater, 0.86 or greater, 0.87 or greater, 0.88 or greater, 0.89 or greater, or 0.90 or greater. The circularity of the active material is defined as $4\pi S/L^2$, where S is the orthographic area of a particle and L is the circumference of an orthographic image of the particle. The circularity of the active material can be determined by observing the exterior of the particle or the cross-sectional shape described above with a scanning electron microscope (SEM), a transmission electron microscope (TEM), or an optical microscope.

The second active material 1*b* may be a solid particle, may be a hollow particle, or may be a particle having a void. When the second active material 1*b* is a hollow particle or a particle having a void, it is considered possible to fill a hollow portion or a void portion with a liquid. For example, an electrolytic solution spreads not only on the outer surface of the active material but also to the inside thereof, and contact area between the particle and the electrolytic solution is easily increased.

1.2.4 Size of Second Active Material

The size of the second active material 1*b* is not particularly limited as long as the relationship of the above $D_{1L}/D_2$ is satisfied. For example, the diameter $D_2$ of the second active material 1*b* may be 0.5 μm or more and 10 μm or less, 1.0 μm or more and 8.0 μm or less, or 2.0 μm or more and 6.0 μm or less. Note that, the diameter $D_2$ of the second active material 1*b* refers to an equivalent circle diameter when the exterior or cross-sectional shape of the second active material 1*b* is observed with SEM. When the positive electrode mixture 1 comprises a plurality of second active materials 1*b*, the diameter $D_2$ of the second active materials 1*b* is a number average value of equivalent circle diameters of the plurality of second active materials 1*b* contained in the positive electrode mixture 1.

1.3 Ratio of Long Diameter of First Active Material to Diameter of Second Active Material In the positive electrode mixture 1, the ratio $D_{1L}/D_2$ of the long diameter $D_{1L}$ of the first active material 1*a* to the diameter $D_2$ of the second active material 1*b* is 0.1 or greater and 1.5 or less. The ratio $D_{1L}/D_2$ may be 0.2 or greater and 1.5 or less, 0.3 or greater and 1.5 or less, 0.4 or greater and 1.5 or less, 0.5 or greater and 1.5 or less, 0.6 or greater and 1.5 or less, 0.7 or greater and 1.5 or less, 0.8 or greater and 1.5 or less, 0.9 or greater and 1.5 or less, 1.0 or greater and 1.5 or less, or 1.1 or greater and 1.5 or less, or may be 0.1 or greater and less than 1.5, 0.1 or greater and 1.4 or less, or 0.1 or greater and 1.3 or less. By having the second active material 1*b* at a predetermined size relative to the first active material 1*a*, the first active material 1*a* is raised by the second active material 1*b*, as described below, the amount of the first active material 1*a* intersecting with the plane direction of the positive electrode active material layer 20 increases, the degree of curvature is decreased, and utilization rate of the first active material 1*a* is easily increased. In addition, the second active material 1*b* itself can contribute to capacity improvement. As a result, the capacity of the positive electrode is easily increased.

1.3 Ratio of First Active Material to Second Active Material

In the positive electrode mixture 1, the ratio of the first active material 1*a* relative to the total of the first active material 1*a* and the second active material 1*b* is 10% by mass or greater and 90% by mass or less. If the amount of the first active material 1*a* is too small or too large, capacity tends to decrease. The mass ratio of the first active material 1*a* relative to the total of the first active material 1*a* and the second active material 1*b* may be lower or higher than the mass ratio of the second active material 1*b*. When combined with a solid electrolyte, the higher the mass ratio of the first active material 1*a* relative to the total of the first active material 1*a* and the second active material 1*b* than the mass ratio of the second active material 1*b*, the more easily excellent performance is exhibited. When combined with a liquid electrolyte, the lower the mass ratio of the first active material 1*a* relative to the total of the first active material 1*a* and the second active material 1*b* than the mass ratio of the second active material 1*b*, the more easily excellent performance is exhibited. The ratio of the first active material 1*a* may be 15% by mass or greater and 85% by mass or less. The lower limit may be 20% by mass or greater, 25% by mass or greater, 30% by mass or greater, 35% by mass or greater, 40% by mass or greater, 45% by mass or greater, 50% by mass or greater, 55% by mass or greater, 60% by mass or greater, 65% by mass or greater, or 70% by mass or greater. The upper limit may be 80% by mass or less, 75% by mass or less, 70% by mass or less, 65% by mass or less, 60% by mass or less, 55% by mass or less, 50% by mass or less, 45% by mass or less, 40% by mass or less, 35% by mass or less, 30% by mass or less, 25% by mass or less, 20% by mass or less, or 15% by mass or less.

1.4 Additional Components

The positive electrode mixture 1 at least comprises the above first active material 1*a* and second active material 1*b* as positive electrode active materials. The positive electrode mixture 1 may comprise an electrolyte. The electrolyte may be a solid electrolyte, may be a liquid electrolyte, or may be a combination of a solid electrolyte and a liquid electrolyte. When the positive electrode mixture 1 comprises a solid electrolyte, an excellent effect is easily exhibited. The positive electrode mixture 1 may comprise one or both of a conductive aid and a binder. The positive electrode mixture 1 may comprise an electrolyte and one or both of a conductive aid and a binder. The positive electrode mixture 1 may comprise an electrolyte, a conductive aid, and a binder. Further, the positive electrode mixture 1 may comprise various additives. The content of each of the first active material 1*a*, second active material 1*b*, electrolyte, conductive aid, and binder in the positive electrode mixture 1 needs only to be appropriately determined in accordance with target performance. For example, when the entire positive electrode mixture 1 (entire solid content) is 100% by mass, the content of the positive electrode active material (total of first active material 1*a*, second active material 1*b*, and additional positive electrode active material) may be 40% by mass or greater and 100% by mass or less. The lower limit may be 50% by mass or greater or 60% by mass or greater. The upper limit may be 90% by mass or less.

1.4.1 Additional Positive Electrode Active Material

The positive electrode mixture 1 may contain only the above first active material 1*a* and second active material 1*b* as positive electrode active materials. Alternatively, the positive electrode mixture 1 may contain a different type of positive electrode active material (additional positive electrode active material), in addition to the first active material 1*a* and the second active material 1*b*. From the viewpoint of further enhancing the effect according to the technique of the present disclosure, the content ratio of the additional positive electrode active material in the positive electrode mixture 1 may be small. For example, when the entirety of the positive electrode active material contained in the positive electrode mixture 1 is 100% by mass, the content ratio of positive electrode active material from the above first active material 1*a* and second active material 1*b* may be 50% by mass or greater and 100% by mass or less, 60% by mass or greater and 100% by mass or less, 70% by mass or greater and 100% by mass or less, 80% by mass or greater and 100% by mass or less, 90% by mass or greater and 100% by mass or less, 95% by mass or greater and 100% by mass or less, or 99% by mass or greater and 100% by mass or less.

Any known positive electrode active material for batteries can be adopted as an additional positive electrode active material. Of known active materials, materials having a relatively high electric potential (charge-discharge potential) for storing and releasing a predetermined carrier ion can be used as positive electrode active materials, and materials having a relatively low electric potential therefor can be used as negative electrode active materials. The additional positive electrode active material, for example, may be at least one selected from various lithium-containing compounds, elemental sulfur, and sulfur compounds. The lithium-containing compound as a positive electrode active material may be a lithium-containing oxide comprising at least one element M; Li; and O. The element M, for example, may be at least one selected from Mn, Ni, Co, Al, Mg, Ca, Sc, V, Cr, Cu, Zn, Ga, Ge, Y, Zr, Sn, Sb, W, Pb, Bi, Fe, and Ti, or may be at least one selected from the group consisting of Mn, Ni, Co, Al, Fe, and Ti. More specifically, the lithium-containing oxide may be at least one selected from lithium cobaltate, lithium nickelate, lithium manganate, lithium nickel cobaltate, lithium nickel manganate, lithium cobalt manganate, lithium nickel-cobalt-manganese oxide ($Li_{1\pm\alpha}Ni_xCo_yMn_2O_{2\pm\delta}$ (for example, 0<x<1, 0<y<1, 0<z<1, and x+y+z=1)), spinel-based lithium compounds (heteroelement-substituted Li—Mn spinels having a composition represented by $Li_{1+x}Mn_{2-x-y}M_yO_4$ (M is one or more selected from Al, Mg, Co, Fe, Ni, and Zn)), lithium nickel-cobalt-aluminum oxide (for example, $Li_{1\pm\alpha}Ni_pCo_qAl_rO_{2\pm\delta}$ (for example, p+q+r=1)), lithium titanate, and lithium metal phosphate (such as $LiMPO_4$; M is one or more selected from Fe, Mn, Co, and Ni). The additional positive electrode active material may comprise a lithium-containing oxide at least comprising at least one of Ni, Co, and Mn; Li; and O as constituent elements. Alternatively, the additional positive electrode active material may comprise a lithium-containing oxide at least comprising at least one of Ni, Co, and Al; Li; and O as constituent elements. The additional positive electrode active material may be of one type used alone, or may be of two or more types used in combination.

The shape of the additional positive electrode active material needs only to be any general shapes of positive electrode active materials of batteries. The additional positive electrode active material, for example, may be particulate. The additional positive electrode active material may have voids therein, for example, may be porous or hollow. The additional positive electrode active material may be of primary particles, or may be of secondary particles of a plurality of agglomerated primary particles. The average particle size D50 of the additional positive electrode active material, for example, may be 1 nm or more and 500 μm or less, the lower limit may be 5 nm or more or 10 nm or more, and the upper limit may be 100 μm or less, 50 μm or less, or 30 μm or less. Note that the average particle size D50 is the 50% cumulative particle size (median diameter) in a volume-based particle size distribution determined by a laser diffraction/scattering method.

1.4.2 Protective Layer

A protective layer having ion-conducting properties may be formed on the surface of the positive electrode active material (first active material 1*a*, second active material 1*b*, and an additional positive electrode active material). Specifically, the positive electrode mixture 1 may comprise a composite of a positive electrode active material and a protective layer, and at least a portion of the surface of the positive electrode active material of the composite may be covered by the protective layer. As a result, for example, a reaction between the positive electrode active material and another battery material (such as a sulfide solid electrolyte described below) is easily suppressed. The protective layer having ion-conducting properties can comprise various ion-conducting compounds. The ion-conducting compound, for example, may be at least one selected from an ion-conducting oxide and an ion-conducting halide.

The ion-conducting oxide, for example, may comprise at least one element selected from B, C, Al, Si, P, S, Ti, La, Zr, Nb, Mo, Zn, and W; Li; and O. The ion-conducting oxide may be an oxynitride comprising N. More specifically, the ion-conducting oxide may be at least one selected from $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, $Li_2WO_4$, LiPON, $Li_2O$—$LaO_2$, and $Li_2O$—$ZnO_2$. The ion-conducting oxide may have a portion of elements substituted by various doping elements.

The ion-conducting halide, for example, may be at least one of various compounds exemplified as a halide solid electrolyte described below. The halide having ion-conducting properties, for example, may comprise at least one element selected from the group consisting of Mg, Ca, Sr, Ba, Zn, Sn, Al, Sc, Ga, Bi, Sb, Zr, Hf, Ti, Ta, Nb, W, Y, Gd, Tb, and Sm; at least one halogen element selected from the group consisting of Cl, Br, I, and F; and Li. The halide having ion-conducting properties may comprise at least one selected from the group consisting of Ti, Al, Gd, Ca, Zr, and Y; at least one selected from the group consisting of Cl, Br, I, and F; and Li. The halide having ion-conducting properties may comprise at least one element selected from the group consisting of Ti and Al; at least one element selected from the group consisting of Cl, Br, I, and F; and Li. The halide having ion-conducting properties, for example, may be a complex halide of Li, Ti, Al, and F.

The coverage (area ratio) of the protective layer relative to the surface of the positive electrode active material, for example, may be 70% or greater, may be 80% or greater, or may be 90% or greater. The thickness of the protective layer, for example, may be 0.1 nm or more and 100 nm or less. The lower limit may be 1 nm or more, and the upper limit may be 20 nm or less.

1.4.3 Electrolyte

The positive electrode mixture 1 can comprise an electrolyte. The electrolyte that can be contained in the positive electrode mixture 1 may be a solid electrolyte, may be a liquid electrolyte, or may be a combination of a solid electrolyte and a liquid electrolyte. As described above, when the positive electrode mixture 1 comprises a solid electrolyte, an excellent effect is easily exhibited.

1.4.3.1 Solid Electrolyte

The solid electrolyte needs only to be any known solid electrolyte for lithium-ion batteries. The solid electrolyte may be an inorganic solid electrolyte or an organic polymer electrolyte. Particularly, an inorganic solid electrolyte has excellent ion-conducting properties and heat resistance. Examples of the inorganic solid electrolyte include oxide solid electrolytes, sulfide solid electrolytes, and inorganic solid electrolytes having ion-binding properties. Among the inorganic solid electrolytes, the performance of sulfide solid electrolytes, particularly sulfide solid electrolytes comprising at least Li, S, and P as constituent elements, is high. Alternatively, among the inorganic solid electrolytes, the performance of solid electrolytes having ion-binding properties, particularly solid electrolytes comprising at least Li, Y, and a halogen (at least one of Cl, Br, I, and F) as constituent elements, is high. The solid electrolyte may be amorphous, or may be crystalline. The solid electrolyte may be particulate. The average particle size (D50) of the solid electrolyte, for example, may be 10 nm or more and 10 μm or less. Note that, the average particle size D50 referred to herein is the 50% cumulative particle size (median diameter) in a volume-based particle size distribution determined by a laser diffraction/scattering method. The ion conductivity of the solid electrolyte at 25° C., for example, may be $1\times10^{-5}$ S/cm or more, $1\times10^{-4}$ S/cm or more, or $1\times10^{-3}$ S/cm or more. The solid electrolyte may be of one type used alone, or may be of two or more types used in combination.

The oxide solid electrolyte may be one or more selected from lithium lanthanum zirconate, LiPON, $Li_{1+x}Al_xGe_{2-x}(PO_4)_3$, Li—SiO-based glass, and Li—Al—S—O-based glass. When an oxide solid electrolyte and a liquid electrolyte are combined, ion-conducting properties can be improved.

The sulfide solid electrolyte may be a glass-based sulfide solid electrolyte (sulfide glass), may be a glass-ceramic-based sulfide solid electrolyte, or may be a crystal-based sulfide solid electrolyte. The sulfide glass is amorphous. The sulfide glass may have a glass transition temperature (Tg). When the sulfide solid electrolyte has a crystal phase, examples of the crystal phase include Thio-LISICON-type crystal phase, LGPS-type crystal phase, and argyrodite-type crystal phase.

The sulfide solid electrolyte, for example, may contain Li element, an X element (X is at least one of P, As, Sb, Si, Ge, Sn, B, Al, Ga, and In), and S element. In addition, the sulfide solid electrolyte may further contain at least one of O element and a halogen element. Further, the sulfide solid electrolyte may contain S element as an anionic element main component.

The sulfide solid electrolyte, for example, may be at least one selected from $Li_2S—P_2S_5$, $Li_2S—P_2S_5—LiI$, $Li_2S—P_2S_5—GeS_2$, $Li_2S—P_2S_5—Li_2O$, $Li_2S—P_2S_5—Li_2O—LiI$, $Li_2S—P_2S_5—LiI—LiBr$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5$-ZmSn (where m and n are positive numbers, and Z is any of Ge, Zn, and Ga), $Li_2S—GeS_2$, $Li_2S—SiS_2—Li_3PO_4$, and $Li_2S—SiS_2$-$Li_xMO_y$ (where x and y are positive numbers, and M is any of P, Si, Ge, B, Al, Ga, and In).

The composition of the sulfide solid electrolyte is not particularly limited. Examples thereof include $xLi_2S\cdot(100-x)P_2S_5$ ($70\leq x\leq 80$) and $yLiI\cdot zLiBr\cdot(100-y-z)(xLi_2S\cdot(1-x)P_2S_5)$ ($0.7\leq x\leq 0.8$, $0\leq y\leq 30$, and $0\leq z\leq 30$). Alternatively, the sulfide solid electrolyte may have a composition represented by general formula: $Li_{4-x}Ge_{1-x}P_xS_4$ ($0<x<1$). In the above general formula, at least a portion of Ge may be substituted with at least one of Sb, Si, Sn, B, Al, Ga, In, Ti, Zr, V, and Nb. In the above general formula, at least a portion of P may be substituted with at least one of Sb, Si, Sn, B, Al, Ga, In, Ti, Zr, V, and Nb. In the above general formula, a portion of Li may be substituted with at least one of Na, K, Mg, Ca, and Zn. In the above general formula, a portion of S may be substituted with a halogen (at least one of F, Cl, Br, and I). Alternatively, the sulfide solid electrolyte may have a composition represented by $Li_{7-a}PS_{6-a}X_a$ (X is at least one of Cl, Br, and I, and a is a number of 0 or greater and 2 or less). a may be 0 or may be greater than 0. In the latter case, a may be 0.1 or greater, may be 0.5 or greater, or may be 1 or greater. a may be 1.8 or less, or may be 1.5 or less.

The solid electrolyte having ion-binding properties, for example, may comprise at least one element selected from the group consisting of Mg, Ca, Sr, Ba, Zn, Sn, Al, Sc, Ga, Bi, Sb, Zr, Hf, Ti, Ta, Nb, W, Y, Gd, Tb, and Sm. These elements can generate cations in water. The ion-binding solid electrolyte material, for example, may comprise at least one halogen element selected from the group consisting of Cl, Br, I, and F. These elements can generate anions in water. The solid electrolyte having ion-binding properties may comprise at least one selected from the group consisting of Gd, Ca, Zr, and Y, at least one selected from the group consisting of Cl, Br, I, and F, and Li. The solid electrolyte having ion-binding properties comprises Li and Y, and may comprise at least one selected from the group consisting of Cl, Br, I, and F. More specifically, the solid electrolyte having ion-binding properties may comprise Li, Y, Cl, and Br, may comprise Li, Ca, Y, Gd, Cl, and Br, or may comprise Li, Zr, Y, and Cl. Even more specifically, the solid electrolyte having ion-binding properties may be at least one of $Li_3YBr_2Cl_4$, $Li_{2.8}Ca_{0.1}Y_{0.5}Gd_{0.5}Br_2Cl_4$, and $Li_{2.5}Y_{0.5}Zr_{0.5}Cl_6$.

The solid electrolyte having ion-binding properties may be a halide solid electrolyte. A halide solid electrolyte has excellent ion-conducting properties. The halide solid electrolyte may have a composition represented by, for example, formula (1):

$$Li_\alpha M_\beta X_\gamma \quad (1)$$

where α, β, and γ are each independently a value greater than 0, M is at least one selected from the group consisting of metal elements other than Li and semimetal elements, and X is at least one selected from the group consisting of Cl, Br, and I. Note that a "semimetal element" may be at least one selected from the group consisting of B, Si, Ge, As, Sb, and Te. Further, a "metal element" may include (i) all of the elements contained from Group 1 to Group 12 of the periodic table (excluding hydrogen) and (ii) all of the elements contained from Group 13 to Group 16 of the periodic table (excluding B, Si, Ge, As, Sb, Te, C, N, P, O, S, and Se). A metal element can form an inorganic compound with halide ions and form cations.

In the formula (A), M may comprise Y (i.e., yttrium). A halide solid electrolyte comprising Y may have a composition represented by $Li_aMe_bY_cX_6$ (where $a+mb+3c=6$, $c>0$, Me is at least one selected from the group consisting of metal elements and semimetal elements other than Li and Y, and m is the valence of Me). Me, for example, may be at least one selected from the group consisting of Mg, Ca, Sr, Ba, Zn, Sc, Al, Ga, Bi, Zr, Hf, Ti, Sn, Ta, and Nb.

The halide solid electrolyte may have a composition represented by formula (A1): $Li_{6-3d}Y_dX_6$. In the formula (A1), X is one or more elements selected from the group consisting of Cl, Br, and I. d may satisfy $0<d<2$, or may be $d=1$. The halide solid electrolyte may have a composition represented by formula (A2): $Li_{3-3\delta}Y_{1+\delta}Cl_6$. In the formula (A2), δ may be $0<\delta\leq 0.15$. The halide solid electrolyte may have a composition represented by formula (A3): $Li_{3-3\delta}Y_{1+\delta}Br_6$. In the formula (A3), δ may be $0<\delta\leq 0.25$. The halide solid electrolyte may have a composition represented by formula (A4): $Li_{3-3\delta+a}Y_{1+\delta-a}Me_aCl_{6-x-y}Br_xI_y$. In the formula (A4), Me may be at least one selected from the group consisting of Mg, Ca, Sr, Ba, and Zn. In the formula (A4), for example, $-1<\delta<2$, $0<a<3$, $0<(3-3\delta+a)$, $0<(1+\delta-a)$, $0\leq x\leq 6$, $0\leq y\leq 6$, and $(x+y)\leq 6$ are satisfied. The halide solid electrolyte may have a composition represented by formula (A5): $Li_{3-3\delta}Y_{1+\delta-a}Me_aCl_{6-x-y}Br_xI_y$. In the formula (A5), Me may be at least one selected from the group consisting of Al, Sc, Ga, and Bi. In the formula (A5), the variables may satisfy $-1<\delta<1$, $0<a<2$, $0<(1+\delta-a)$, $0\leq x\leq 6$, $0\leq y\leq 6$, and $(x+y)\leq 6$. The halide solid electrolyte may have a composition represented by formula (A6): $Li_{3-3\delta-a}Y_{1+\delta-a}Me_aCl_{6-x-y}Br_xI_y$. In the formula (A6), Me may be at least one selected from the group consisting of Zr, Hf, and Ti. In the formula (A6), the variables may satisfy $-1<\delta<1$, $0<a<1.5$, $0<(3-3\delta-a)$, $0<(1+\delta-a)$, $0\leq x\leq 6$, $0\leq y\leq 6$, and $(x+y)\leq 6$. The halide solid electrolyte may have a composition represented by formula (A7): $Li_{3-3\delta-2a}Y_{1+\delta-a}Me_aCl_{6-x-y}Br_xI_y$. In the formula (A7), Me may be at least one selected from the group consisting of Ta and Nb. In the formula (A7), the variables may satisfy $-1<\delta<1$, $0<a<1.2$, $0<(3-3\delta-2a)$, $0<(1+\delta-a)$, $0\leq x\leq 6$, $0\leq y\leq 6$, and $(x+y)\leq 6$.

The solid electrolyte having ion-binding properties may be a complex hydride solid electrolyte. The complex hydride solid electrolyte can be composed of Li ions and complex ions comprising H. The complex ion comprising H, for example, may comprise an element M comprising at least one of nonmetal elements, semimetal elements, and metal elements and H bonded to the element M. In the complex ion comprising H, an element M as a central element and H surrounding the element M may be bonded to each other via a covalent bond. The complex ion comprising H may be represented by $(M_mH_n)^{\alpha-}$. In this case, m can be any positive number, and n and α can take on any positive number depending on m and the valence of the element M. The element M needs only to be any nonmetal element or metal element that can form a complex ion. For example, the element M may comprise at least one of B, C, and N as a nonmetal element, or may comprise B. Further, for example, the element M may comprise at least one of Al, Ni, and Fe as a metal element. Particularly, when the complex ion comprises B or comprises C and B, higher ion-conducting properties are easily ensured. Specific examples of the complex ion comprising H include $(CB_9H_{10})^-$, $(CB_{11}H_{12})^-$, $(B_{10}H_{10})^{2-}$, $(B_{12}H_{12})^{2-}$, $(BH_4)^-$, $(NH_2)^-$, $(AlH_4)^-$, and combinations thereof. Particularly, when $(CB_9H_{10})^-$, $(CB_{11}H_{12})^-$, or a combination thereof is used, higher ion-conducting properties are easily ensured. Specifically, the complex hydride solid electrolyte may comprise Li, C, B, and H.

1.4.3.2 Liquid Electrolyte

The liquid electrolyte (electrolytic solution) is a liquid comprising carrier ions. When a positive electrode mixture for lithium-ion batteries is assumed, the electrolytic solution comprises lithium ions. The electrolytic solution may be a water-based electrolytic solution or a non-water-based electrolytic solution. The composition of the electrolytic solution needs only to be the same as one known as a composition of an electrolytic solution for lithium-ion batteries. The electrolytic solution may be water or a non-water-based solvent dissolving a lithium salt. Examples of the non-water-based solvent include carbonate-based solvents. The carbonate-based solvent includes fluoroethylene carbonate (FEC), ethylene carbonate (EC), and dimethyl carbonate (DMC). Examples of the lithium salt include $LiPF_6$, LiTFSI, and LiFSI.

1.4.4 Conductive Aid

Examples of the conductive aid that can be contained in the positive electrode mixture 1 include carbon materials such as vapor-grown carbon fiber (VGCF), acetylene black (AB), ketjen black (KB), carbon nanotube (CNT), and carbon nanofiber (CNF); and metal materials such as nickel, titanium, aluminum, and stainless steel. The conductive aid, for example, may be particulate or fibrous, and the size thereof is not particularly limited. The conductive aid may be of one type used alone, or may be of two or more types used in combination.

1.4.5 Binder

Examples of the binder that can be contained in the positive electrode mixture 1 include butadiene rubber (BR)-based binders, butylene rubber (IIR)-based binders, acrylate-butadiene rubber (ABR)-based binders, styrene-butadiene rubber (SBR)-based binders, polyvinylidene fluoride (PVdF)-based binders, polytetrafluoroethylene (PTFE)-based binders, and polyimide (PI)-based binders. The binder may be of one type used alone, or may be of two or more types used in combination.

1.4.6 Others

The positive electrode mixture 1 may comprise various additives, in addition to the above components, for example, a dispersant or a lubricant.

1.5 Effect Due to Positive Electrode Mixture

Figure 3:
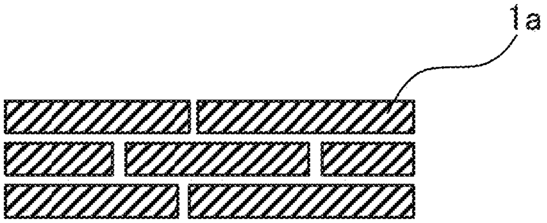
FIG. 3 is a schematic drawing for explaining the problem of a plate-like O2-type active material.

As described above, the positive electrode mixture 1 comprises a predetermined first active material 1*a* and a predetermined second active material 1*b*. A plate-like O2-type active material (first active material 1*a*) has entrances and exits for intercalation at the end portions thereof. Thus, when a positive electrode active material layer is formed using a plate-like O2-type active material, it is preferable that plate surfaces of the plate-like O2-type active material in the positive electrode active material layer intersect (preferably perpendicularly intersect) the surface direction of the positive electrode active material layer. However, when the positive electrode active material layer is constituted using only a plate-like O2-type active material as the positive electrode active material, plate surfaces of the plate-like O2-type active material run along the surface direction of the positive electrode active material layer (FIG. 3). Thus, capacity is easily decreased due to an increase in degree of curvature and a decrease in utilization rate of the plate-like O2-type active material. However, according to the positive electrode mixture 1, by mixing the plate-like O2-type active material with a spherical O2-type active material (second active material 1*b*), the plate-like O2-type active material can be raised by the spherical O2-type active material, and orientation of plate surfaces of the plate-like O2-type active material is easily randomized (FIG. 1). Specifically, the amount of plate-like O2-type active material intersecting the surface direction of the positive electrode active material layer 20 is increased, and capacity is easily increased by a decrease in degree of curvature and an increase in utilization rate of plate-like O2-type active material. In addition, the spherical O2-type active material itself can contribute to capacity improvement, and as a result, capacity can be further increased.

2. Manufacturing Method for Positive Electrode Mixture

The positive electrode mixture 1 is obtained by mixing at least a first active material 1*a* and a second active material 1*b*. The first active material 1*a* and the second active material 1*b* can be manufactured, for example, as follows.

2.1 Manufacturing Method for First Active Material and Second Active Material

Figure 4:
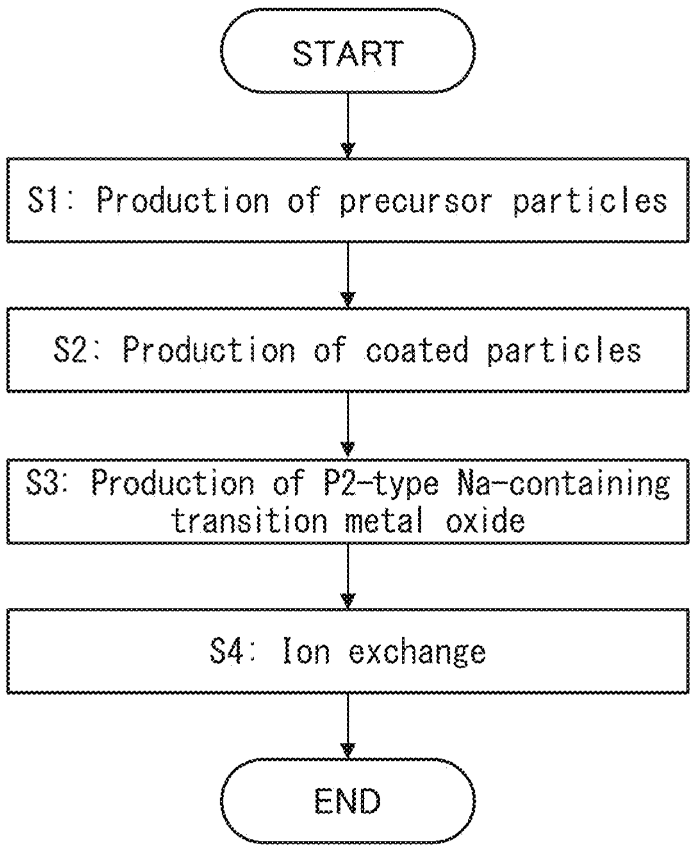
FIG. 4 shows one example of the flow of a manufacturing method for the first active material and the second active material.

As shown in FIG. 4, a manufacturing method for each of the first active material 1*a* and the second active material 1*b* may comprise

- obtaining a precursor particle (step S1),
- coating a surface of the precursor particle with a Na salt to obtain a coated particle (step S2),
- firing the coated particle to obtain a Na-containing transition metal oxide particle having a P2-type structure (step S3), and
- substituting at least a portion of Na in the Na-containing transition metal oxide particle with Li by ion exchange to obtain a positive electrode active material particle having an O2-type structure (step S4).

2.1.1 Step S1

In step S1, a precursor particle is obtained. The precursor particle may be a salt or compound comprising at least one transition metal element among Mn, Ni, and Co. The precursor particle, for example, may be at least one of a carbonate, a sulfate, a nitrate, an acetate, and a hydroxide. Specifically, the precursor particle may be a salt represented by $MeCO_3$ (Me is at least one transition metal element among Mn, Ni, and Co), may be a salt represented by $MeSO_4$, may be a salt represented by $Me(NO_3)_2$, may be a salt represented by $Me(CH_3COO)_2$, or may be a compound represented by $Me(OH)_2$. These may be hydrates. In addition, the precursor particle may comprise at least one element selected from B, Mg, Al, K, Ca, Ti, V, Cr, Fe, Cu, Zn, Ga, Ge, Sr, Y, Zr, Nb, Mo, and W, in addition to the transition metal element Me.

The precursor particle may be spherical. The definition of "spherical" is as stated above. By having a spherical precursor particle, the shape of the finally obtained active material can be spherical. In other words, the second active material 1*b* is easily obtained. The size of the spherical precursor particle is not particularly limited. The spherical precursor particle can be obtained, for example, by a solution method such as a coprecipitation method or a sol-gel method. Specifically, in the case of a coprecipitation method, an aqueous solution of $MeSO_4$ and an aqueous solution of $Na_2CO_3$ are prepared, the aqueous solutions are added dropwise and mixed, whereby a precipitate is obtained. The precipitate is a spherical precursor particle represented by $MeCO_3$. A carbonate comprising Me and M may be obtained as a precursor particle by dissolving a sulfate of M in an aqueous solution of $MeSO_4$.

2.1.2 Step S2

In step S2, a surface of the above precursor particle is coated with Na salt to obtain a coated particle. When obtaining a spherical O2-type positive electrode active material (second active material 1*b*), the coated particle may be obtained by coating 40% by area or greater of a surface of the above precursor particle with a Na salt. The coated particle may be obtained by coating 50% by area or greater, 60% by area or greater, or 70% by area of the surface of the above precursor particle with a Na salt. Examples of the Na salt include carbonates and nitrates.

The method of coating the surface of the precursor particle with a Na salt includes various methods. When finally obtaining a spherical O2-type positive electrode active material (second active material 1*b*), for example, a rolling fluidized coating method or a spray drying method is preferably adopted. Specifically, a coating solution in which a Na salt is dissolved is prepared, the coating solution is brought into contact with the entire surface of the precursor particle, and simultaneously or subsequently dried. By adjusting the conditions (such as temperature, time, and number of times) of coating, for example, 40% by area or greater of the surface of the precursor particle can be coated with a Na salt. According to the findings of the present inventors, when the coverage of the Na salt is small, P2-type crystals tend to grow abnormally on the surface of the coated particle when the coated particle is fired, and a plate-like Na-containing transition metal oxide particle is obtained while a spherical Na-containing transition metal oxide particle is difficult to obtain. When the coverage of the Na salt is large, crystallites of P2-type crystals can be small when the coated particle is fired, and the shape of the coated particle is likely spherical, corresponding to the shape of the precursor particle. The coating amount of the Na salt on the coated particle may be of any amount as long as the amount (an amount such that a sufficient amount of Na is doped) is sufficient for obtaining a P2-type structure.

2.1.3 Step S3

In step S3, the above coated particle is fired to obtain a Na-containing transition metal oxide particle having a P2-type structure. The Na-containing transition metal oxide particle may be plate-like or may be spherical. When the Na-containing transition metal oxide particle is plate-like, the subsequently obtained O2-type positive electrode active material is also plate-like. In other words, the first active material 1*a* is obtained. On the other hand, when the Na-containing transition metal oxide particle is spherical, the subsequently obtained O2-type positive electrode active material is also spherical. In other words, the second active material 1*b* is obtained.

The Na-containing transition metal oxide particle may at least comprise at least one transition metal element among Mn, Ni, and Co; Na; and O as constituent elements. Particularly, when the constituent elements at least include Na, Mn, at least one of Ni and Co, and O, especially when the constituent elements include at least Na, Mn, Ni, Co, and O, performance of the positive electrode active material particle tends to be higher. The Na-containing transition metal oxide particle may have a chemical composition represented by $Na_cMn_{x-p}Ni_{y-q}Co_{z-r}M_{p+q+r}O_2$, where $0<c\leq 1.00$, $x+y+z=1$, and $0\leq p+q+r\leq 0.15$. In addition, M is at least one element selected from B, Mg, Al, K, Ca, Ti, V, Cr, Fe, Cu, Zn, Ga, Ge, Sr, Y, Zr, Nb, Mo, and W. When the Na-containing transition metal oxide particle has such a chemical composition, a P2-type structure is more easily maintained. In the above chemical composition, c may be greater than 0, 0.10 or greater, 0.20 or greater, 0.30 or greater, 0.40 or greater, 0.50 or greater, or 0.60 or greater, and may be 1.00 or less, 0.90 or less, 0.80 or less, or 0.70 or less. In the above chemical composition, x may be 0 or greater, 0.10 or greater, 0.20 or greater, 0.30 or greater, 0.40 or greater, or 0.50 or greater, and may be 1.00 or less, 0.90 or less, 0.80 or less, 0.70 or less, 0.60 or less, or 0.50 or less. In the above chemical composition, y may be 0 or greater, 0.10 or greater, or 0.20 or greater, and may be 1.00 or less, 0.90 or less, 0.80 or less, 0.70 or less, 0.60 or less, 0.50 or less, 0.40 or less, 0.30 or less, or 0.20 or less. In the above chemical composition, z may be 0 or greater, 0.10 or greater, 0.20 or greater, or 0.30 or greater, and may be 1.00 or less, 0.90 or less, 0.80 or less, 0.70 or less, 0.60 or less, 0.50 or less, 0.40 or less, or 0.30 or less. Many types of M make a small contribution towards charging-discharging. In this regard, by having p+q+r at 0.15 or less, a high charging-discharging capacity is easily ensured. p+q+r may be 0.10 or less, or may be 0. The composition of O is approximately 2, but is variable without being limited to exactly 2.0.

The firing temperature may be any temperature as long as a P2-type structure is generated. When the firing temperature is too low, Na doping is not carried out and a P2-type structure is difficult to obtain. On the other hand, when the firing temperature is too high, an O3-type structure, not a P2-type structure, is easily generated. The firing temperature, for example, may be 700° C. or higher and 1100° C. or lower, or may be 800° C. or higher and 1000° C. or lower.

The firing time needs only to be appropriately adjusted in accordance with the shape of the intended Na-containing transition metal oxide particle. As stated above, when the coverage of the Na salt on the coated particle is small, P2-type crystals tend to grow abnormally on the surface of the coated particle when the coated particle is fired, and a plate-like Na-containing transition metal oxide particle is easily obtained. On the other hand, when the coverage of the Na salt on the coated particle is large, small P2-type crystal crystallites are easily formed on the surface of the coated particle when the particle is fired, and a spherical Na-containing transition metal oxide particle can be obtained by growing P2-type crystals along the surface of the particle so that one P2-type crystallite and another P2-type crystallite are connected to each other. When the firing time is too short, Na doping is not carried out and the intended P2-type structure is not obtained. When the firing time is too long, the P2-type structure grows excessively and a plate-like particle is formed. As far as the present inventors have confirmed, when the firing time is 30 min or more and 3 h or less, a spherical Na-containing transition metal oxide particle is easily obtained, and when this firing time is exceeded, a plate-like Na-containing transition metal oxide particle is easily obtained.

The firing atmosphere is not particularly limited, and for example, may be an oxygen-containing atmosphere such as an ambient air atmosphere or an inert gas atmosphere.

2.1.4 Step S4

In step S4, at least a portion of Na in the above Na-containing transition metal oxide particle is substituted with Li by ion exchange to obtain a positive electrode active material particle having an O2-type structure. A portion of Na in the plate-like P2-type particle is ion-exchanged with Li, whereby a plate-like O2-type active material (first active material 1*a*) is obtained. A portion of Na in the spherical P2-type particle is ion-exchanged with Li, whereby a spherical O2-type active material (second active material 1*b*) is obtained.

Ion exchange, for example, is a method using aqueous solution comprising a lithium halide or a method using a mixture (for example, a molten salt) of a lithium halide and an additional lithium salt. From the viewpoint of a P2-type structure being easily damaged due to water intrusion and the viewpoint of crystallinity, of the above two methods, it is preferable that the method using a molten salt be used. Specifically, by mixing the Na-containing transition metal oxide particle having the above P2-type structure with the molten salt and heating the mixture to a temperature of the melting point of the molten salt or higher, at least a portion of Na in the Na-containing transition metal oxide particle can be substituted with Li by ion exchange.

The lithium halide constituting the molten salt is preferably at least one of lithium chloride, lithium bromide, and lithium iodide. The additional lithium salt constituting the molten salt is preferably lithium nitrate. By using a molten salt, the melting point is lowered compared to using a lithium halide or an additional lithium salt alone, and ion exchange at a lower temperature is possible.

The temperature during ion exchange, for example, may be the melting point of the above molten salt or higher, and may be 600° C. or lower, 500° C. or lower, 400° C. or lower, or 300° C. or lower. When the temperature during ion exchange is too high, an O3-type structure, which is a stable phase, not an O2-type structure, is easily generated. From the viewpoint of shortening the time for the ion exchange, it is preferable that the temperature during ion exchange be as high as possible.

2.2 Mixing with Additional Components

The first active material 1*a* and the second active material 1*b*, manufactured as described above, are optionally mixed with the above solid electrolyte, whereby a positive electrode mixture 1 is obtained. The mixing means is not particularly limited, and the mixing needs only to be carried out by a known mixing apparatus.

3. Lithium-Ion Battery

Figure 5:
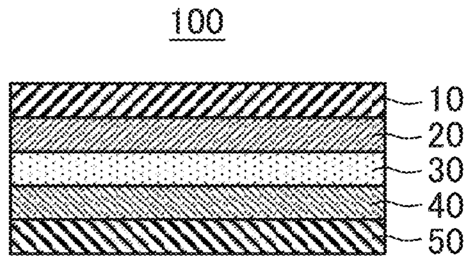
FIG. 5 schematically shows one example of a configuration of a lithium-ion battery.

The positive electrode mixture 1 of the present disclosure can be adopted as a positive electrode material of a lithium-ion battery. FIG. 5 schematically shows a configuration of a lithium-ion battery 100 according to one embodiment. As shown in FIG. 5, the lithium-ion battery 100 comprises a positive electrode active material layer 20, an electrolyte layer 30, and a negative electrode active material layer 40. The positive electrode active material layer 20 comprises the positive electrode mixture 1 of the present disclosure. In the lithium-ion battery 100, one or both of the electrolyte layer 30 and the negative electrode active material layer 40 may comprise a solid electrolyte. In the lithium-ion battery 100, all of the positive electrode active material layer 20, the electrolyte layer 30, and the negative electrode active material layer 40 may comprise a solid electrolyte. Further, the lithium-ion battery 100 may be a solid battery. A solid battery refers to a battery in which an electrolyte having carrier-ion conducting properties is mainly composed of a solid electrolyte. However, a portion thereof may include a liquid component. Alternatively, the lithium-ion battery 100 may be an all-solid battery that is substantially free of a liquid component. As shown in FIG. 5, the lithium-ion battery 100 may be provided with a positive electrode current collector 10 in contact with the positive electrode active material layer 20. In addition, the lithium-ion battery 100 may be provided with a negative electrode current collector 50 in contact with a negative electrode active material layer 40.

3.1 Positive Electrode Current Collector

Any general positive electrode current collector for lithium-ion batteries can be adopted as the positive electrode current collector 10. The positive electrode current collector 10 may have at least one shape selected from foil-like, plate-like, mesh-like, punched metal-like, and a foam. The positive electrode current collector 10 may be composed of a metal foil or a metal mesh. Particularly, a metal foil has excellent handleability. The positive electrode current collector 10 may consist of a plurality of foils. Examples of metals constituting the positive electrode current collector 10 include at least one selected from Cu, Ni, Cr, Au, Pt, Ag, Al, Fe, Ti, Zn, Co, V, Mg, Pg, Ge, In, Sn, Zr, and stainless steel. Particularly, from the viewpoint of ensuring oxidation resistance, the positive electrode current collector 10 may comprise Al. The positive electrode current collector 10 may have on the surface thereof some coating layer for the purpose of adjusting resistance. For example, the positive electrode current collector 10 may have a carbon coating layer. The positive electrode current collector 10 may be a metal foil or substrate plated or vapor-deposited with a metal described above. When the positive electrode current collector 10 consists of a plurality of metal foils, there may be some layer between the plurality of metal foils. The thickness of the positive electrode current collector 10 is not particularly limited, and for example, may be 0.1 μm or more and 1 mm or less. The lower limit may be 1 μm or more, and the upper limit may be 100 μm or less.

3.2 Positive Electrode Active Material Layer

The positive electrode active material layer 20 comprises the above positive electrode mixture 1. The shape of the positive electrode active material layer 20 is not particularly limited, and for example, may be a sheet-like positive electrode active material layer 20 having a substantially flat surface. The thickness of the positive electrode active material layer 20 is not particularly limited, and for example, may be 0.1 μm or more or 1 μm or more, and may be 2 mm or less or 1 mm or less.

The positive electrode active material layer 20 can be manufactured by applying a known method. For example, the positive electrode active material layer 20 can be easily formed by dry- or wet-molding the above positive electrode mixture 1. The positive electrode active material layer 20 may be molded with a positive electrode current collector 10, or may be molded separately from the positive electrode current collector 10.

3.3 Electrolyte Layer

The electrolyte layer 30 is arranged between the positive electrode active material layer 20 and the negative electrode active material layer 40. The electrolyte layer 30 comprises at least an electrolyte. The electrolyte layer 30 may comprise at least one of a solid electrolyte and a liquid electrolyte (electrolytic solution) or both, and may further optionally comprise a binder and various additives. The contents of the electrolyte and the binder in the electrolyte layer 30 are not particularly limited. Alternatively, the electrolyte layer 30 may comprise a separator for retaining an electrolytic solution and preventing contact between the positive electrode active material layer 20 and the negative electrode active material layer 40. The thickness of the electrolyte layer 30 is not particularly limited, and for example, may be 0.1 μm or more and 2 mm or less. The lower limit may be 1 μm or more, and the upper limit may be 1 mm or less.

The electrolyte layer 30 may consist of one layer, or may consist of a plurality of layers. For example, the electrolyte layer 30 may be provided with a first layer arranged on the positive electrode active material layer 20 side and a second layer arranged on the negative electrode active material layer 40 side, wherein the first layer may comprise a first electrolyte and the second layer may comprise a second electrolyte. The first electrolyte and the second electrolyte may be of different types from each other. The first electrolyte and the second electrolyte may each be at least one selected from the above oxide solid electrolytes, sulfide solid electrolytes, and solid electrolytes having ion-binding properties. For example, the first layer may comprise a solid electrolyte having ion-binding properties, and the second layer may comprise at least one of a solid electrolyte having ion-binding properties and a sulfide solid electrolyte.

The electrolyte contained in the electrolyte layer 30 needs only to be appropriately selected from among ones (solid electrolyte and/or liquid electrolyte) exemplified as an electrolyte that can be contained in the positive electrode active material layer 20 described above. The binder that can be contained in the electrolyte layer 30 needs only to be appropriately selected from among ones exemplified as a binder that can be contained in the positive electrode active material layer 20 described above. The electrolyte and the binder may each be of one type used alone, or may be of two or more types used in combination. The separator needs only to be any separator normally used in batteries. Examples thereof include those made of resins such as polyethylene (PE), polypropylene (PP), polyester, and polyamide. The separator may be of a single-layer structure, or may be of a multilayer structure. Examples of separators having a multilayer structure can include separators of a PE/PP two-layer structure and separators of a PP/PE/PP or PE/PP/PE three-layer structure. The separator may consist of a nonwoven fabric such as cellulose nonwoven fabric, resin nonwoven fabric, or glass-fiber nonwoven fabric.

3.4 Negative Electrode Active Material Layer

The negative electrode active material layer 40 comprises at least a negative electrode active material. The negative electrode active material layer 40 may optionally comprise an electrolyte, a conductive aid, a binder, and various additives. The content of each component in the negative electrode active material layer 40 needs only to be appropriately determined in accordance with the target battery performance. For example, when the entire solid content of the negative electrode active material layer 40 is 100% by mass, the content of the negative electrode active material may be 40% by mass or greater, 50% by mass or greater, 60% by mass or greater, or 70% by mass or greater, and may be 100% by mass or less, less than 100% by mass, 95% by mass or less, or 90% by mass or less. Alternatively, when the entire negative electrode active material layer 40 is 100% by volume, the negative electrode active material and optionally the electrolyte, conductive aid, and binder in total may be contained at 85% by volume or greater, 90% by volume or greater, or 95% by volume or greater, and the remaining portion may be voids or additional components. The shape of the negative electrode active material layer 40 is not particularly limited, and for example, may be a sheet having a substantially flat surface. The thickness of the negative electrode active material layer 40 is not particularly limited, and for example, may be 0.1 μm or more and 2 mm or less. The lower limit may be 1 μm or more, 10 μm or more, or 30 μm or more, and the upper limit may be 1 mm or less, 500 μm or less, or 100 μm or less.

3.4.1 Negative Electrode Active Material

Any known negative electrode active material for lithium-ion batteries can be adopted as the negative electrode active material contained in the negative electrode active material layer 40. Of known active materials, various materials having a low electric potential (charge-discharge potential) for storing and releasing a predetermined carrier ion compared to the above positive electrode active material can be adopted. The negative electrode active material, for example, may be at least one selected from silicon-based active materials such as Si, Si alloys, and silicon oxides; carbon-based active materials such as graphite and hard carbon; various oxide-based active materials such as lithium titanate; and metallic lithium and lithium alloys. The negative electrode active material may be of one type used alone, or may be of two or more types used in combination. The shape of the negative electrode active material needs only to be any general shapes of negative electrode active materials of lithium-ion batteries. For example, the negative electrode active material may be particulate. The negative electrode active material particles may be primary particles, or may be secondary particles of a plurality of agglomerated primary particles. The average particle size (D50) of the negative electrode active material particles, for example, may be 1 nm or more and 500 μm or less. The lower limit may be 5 nm or more or 10 nm or more, and the upper limit may be 100 μm or less, 50 μm or less, or 30 μm or less. Alternatively, the negative electrode active material layer 40 may consist of a sheet-like (foil-like or membranous) active material, such as a lithium foil.

3.4.2 Others

The electrolyte that can be contained in the negative electrode active material layer 40 needs only to be appropriately selected from among ones (solid electrolyte and/or liquid electrolyte) exemplified as an electrolyte that can be contained in the positive electrode active material layer 20 described above. The conductive aid that can be contained in the negative electrode active material layer 40, for example, needs only to be appropriately selected from among ones exemplified as a conductive aid that can be contained in the positive electrode active material layer 20 described above. The binder that can be contained in the negative electrode active material layer 40, for example, needs only to be appropriately selected from among one exemplified as a binder that can be contained in the positive electrode active material layer 20 described above. The electrolyte, the conductive aid, and the binder may each be of one type used alone, or may be of two or more types used in combination.

The negative electrode active material layer 40 may comprise various additives, in addition to the above components, for example, a dispersant or a lubricant.

The negative electrode active material layer 40 can be manufactured by applying a known method. For example, the negative electrode active material layer 40 can be easily formed by dry- or wet-molding a negative electrode mixture comprising various components described above. The negative electrode active material layer 40 may be molded with a negative electrode current collector 50, or may be molded separately from the negative electrode current collector 50.

3.5 Negative Electrode Current Collector

Any general negative electrode current collector for lithium-ion batteries can be adopted as the negative electrode current collector 50. The negative electrode current collector 50 may be foil-like, plate-like, mesh-like, punched metal-like, or a foam. The negative electrode current collector 50 may be a metal foil or a metal mesh, and alternatively, may be a carbon sheet. Particularly, a metal foil has excellent handleability. The negative electrode current collector 50 may consist of a plurality of foils or sheets. Metals constituting the negative electrode current collector 50 include at least one selected from Cu, Ni, Cr, Au, Pt, Ag, Al, Fe, Ti, Zn, Co, V, Mg, Pb, Ge, In, Sn, Zr, and stainless steel. Particularly, from the viewpoint of ensuring reduction resistance and the viewpoint of making alloying with lithium difficult, the negative electrode current collector 50 may comprise at least one metal selected from Cu, Ni, and stainless steel. The negative electrode current collector 50 may have on the surface thereof some coating layer for the purpose of adjusting resistance. For example, the negative electrode current collector 50 may have a carbon coating layer. The negative electrode current collector 50 may be an aluminum foil having a carbon coating layer. The negative electrode current collector 50 may be a metal foil or a substrate plated or vapor-deposited with a metal described above. When the negative electrode current collector 50 consists of a plurality of metal foils, there may be some layer between the plurality of metal foils. The thickness of the negative electrode current collector 50 is not particularly limited, and for example, may be 0.1 μm or more and 1 mm or less. The lower limit may be 1 μm or more, and the upper limit may be 100 μm or less.

3.6 Additional Configurations

The lithium-ion battery 100, in addition to the above configuration, may be provided with any general configuration as a battery, for example, tabs or terminals. The lithium-ion battery 100 may be the above configuration housed inside an outer packaging. Any known outer packaging can be adopted as the outer packaging of the battery. In addition, a plurality of lithium-ion batteries 100 may be optionally connected electrically and optionally stacked to form a battery pack. In this case, the battery pack may be housed inside a known battery case. Moreover, the lithium-ion battery 100 may be provided with obvious configurations such as the necessary terminals. Examples of shapes of the lithium-ion battery 100 can include coin-type, laminate-type, cylindrical, and rectangular. The lithium-ion battery 100 may be a secondary battery.

4. Manufacturing Method for Lithium-Ion Battery

Figure 6:
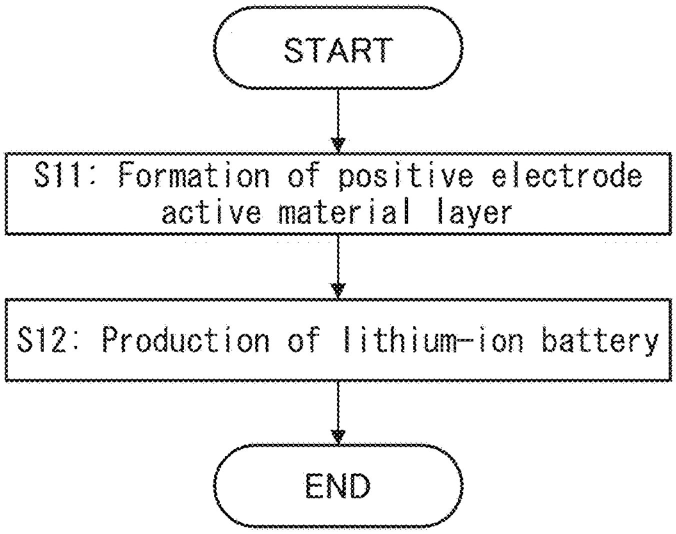
FIG. 6 shows one example of the flow of a manufacturing method for the lithium-ion battery.

The lithium-ion battery 100 can be manufactured by applying a known method. As shown in FIG. 6, the manufacturing method for a lithium-ion battery 100, for example, may comprise using the above positive electrode mixture 1 of the present disclosure to obtain a positive electrode active material layer 20 (step S11), and using the positive electrode active material layer 20, an electrolyte layer 30, and a negative electrode active material layer 40 to obtain a lithium-ion battery 100 (step S12). More specifically, for example, the lithium-ion battery 100 can be manufactured as follows. However, the manufacturing method for the lithium-ion battery 100 is not limited to the following method. For example, each layer may be formed by dry molding.

(1) A positive electrode mixture constituting a positive electrode active material layer is dispersed in a solvent to obtain a positive electrode slurry. The solvent used in this case is not particularly limited, and water and various organic solvents can be used. The positive electrode slurry is then applied on a surface of a positive electrode current collector or an electrolyte layer described below using a doctor blade, followed by drying, whereby a positive electrode active material layer is formed on the surface of the positive electrode current collector or the electrolyte layer to obtain a positive electrode. The positive electrode active material layer may be compression-molded.

(2) A negative electrode mixture constituting a negative electrode active material layer is dispersed in a solvent to obtain a negative electrode slurry. The solvent used in this case is not particularly limited, and water and various organic solvents can be used. The negative electrode slurry is then applied on a surface of a negative electrode current collector or an electrolyte layer described below using a doctor blade, followed by drying, whereby a negative electrode active material layer is formed on the surface of the negative electrode current collector or the electrolyte layer to obtain a negative electrode. The negative electrode active material layer may be compression-molded.

(3) Layers are laminated so that an electrolyte layer is interposed between the negative electrode and the positive electrode to obtain a laminated body comprising a negative electrode current collector, a negative electrode active material layer, an electrolyte layer, a positive electrode active material layer, and a positive electrode current collector in this order. The electrolyte layer, for example, may be obtained by molding an electrolyte mixture comprising an electrolyte and a binder, or may be obtained by compression molding. The laminated body may further be compression-molded. Additional members such as terminals are attached to the laminated body as needed. When using an electrolytic solution, a separator may be adopted in the electrolyte layer.

(4) The laminated body is housed in a battery case and sealed, whereby a lithium-ion battery is obtained.

5. Method for Increasing Capacity of Lithium-Ion Battery

The technique of the present disclosure also has an aspect as a method of increasing capacity of lithium-ion batteries. Specifically, the method of increasing capacity of a lithium-ion battery of the present disclosure is characterized by using the positive electrode mixture of the present disclosure as a material constituting the positive electrode active material layer of the lithium-ion battery.

6. Vehicle Having Lithium-Ion Battery

As described above, when a positive electrode active material layer of a lithium-ion battery is formed using the positive electrode mixture of the present disclosure, an increase in capacity of the lithium-ion battery can be expected. Such a lithium-ion battery, for example, can be suitably used in at least one type of vehicle selected from hybrid vehicle (HEV), plug-in hybrid vehicle (PHEV), and battery electric vehicle (BEV). Specifically, the technique of the present disclosure has an aspect of a vehicle having a lithium-ion battery, wherein the lithium-ion battery comprises a positive electrode active material layer, an electrolyte layer, and a negative electrode active material layer, and the positive electrode active material layer comprises the positive electrode mixture of the present disclosure.

EXAMPLES

From the foregoing, one embodiment for each of the positive electrode mixture, the lithium-ion battery, and the manufacturing methods therefor of the present disclosure has been described. However, it is possible to modify the technique of the present disclosure in various ways other than the above embodiments without departing from the spirit thereof. Hereinafter, the technique of the present disclosure will be further described in detail with reference to the Examples. However, the technique of the present disclosure is not limited to the following Examples.

1. Production of Precursor Particles $MnSO_4 \cdot 5H_2O$, $NiSO_4 \cdot 6H_2O$, and $CoSO_4 \cdot 7H_2O$ were weighed to a target compositional ratio and dissolved in distilled water to a concentration of 1.2 mol/L to obtain a first solution. In a separate container, $Na_2CO_3$ was dissolved in distilled water to a concentration of 1.2 mol/L to obtain a second solution. The first solution and the second solution, each at 500 mL, were then added dropwise at a rate of about 4 mL/min into a reactor already loaded with 1000 mL of pure water. Upon the completion of the dropwise addition, the mixture was stirred at a stirring rate of 150 rpm at room temperature for 1 h. The precipitate was washed with pure water and subjected to solid-liquid separation with a centrifugal separator. The resulting precipitate was dried overnight at 120° C. and crushed with a mortar, fine particles were removed by airflow classification, and mixed salt particles (precursor particles) comprising Mn, Ni, and Co were obtained. The precursor particles were spherical particles having a circularity of 0.98.

2. Production of Na-Containing Transition Metal Oxide Particles Having P2-Type Structure 2.1 First P2-Type Plate-Like Particles $Na_2CO_3$ and the above precursor particles were weighed in a dry atmosphere so as to have a composition of $Na_{0.7}Mn_{0.5}Ni_{0.2}Co_{0.3}O_2$ and mixed in a mortar to obtain a mixture. An alumina crucible was used for firing of the mixture in an electric furnace in an ambient air atmosphere. Specifically, the mixture was subjected to a “first heating step”, a “pre-firing step”, a “second heating step”, a “main firing step”, an “in-furnace cooling step”, and an “out-of-furnace cooling step”, as indicated in Table 1 below. Note that “in-furnace cooling step” refers to a cooling step within an electric furnace, and “out-of-furnace cooling step” means a step of ambient air cooling outside an electric furnace. The fired mixture was then crushed in a mortar in a dry atmosphere to obtain a Na-containing transition metal oxide ($Na_{0.7}Mn_{0.5}Ni_{0.2}Co_{0.3}O_2$) having a P2-type structure. The Na-containing transition metal oxide was in the form of plate-like particles having an aspect ratio (long diameter/short diameter) of the long diameter to the short diameter of 2.0 or greater in the cross-sectional shape along the thickness direction thereof.

TABLE 1

| Step | Starting temperature (° C.) | Ending temperature (° C.) | Time (min) | Heating or cooling rate (° C./min) |
|---|---|---|---|---|
| First heating step | 25 | 600 | 115 | 5 |
| Pre-firing step | 600 | 600 | 360 | 0 |
| Second heating step | 600 | 900 | 60 | 5 |
| Main firing step | 900 | 900 | 60 | 0 |
| In-furnace cooling step | 900 | 250 | 130 | 5 |
| Out-of-furnace cooling step | 250 | 25 | 10 | 22.5 |

2.2 Second P2-Type Plate-Like Particles

Except that the heating time was set to 70 min and the ending temperature was set to 950° C. in the above second heating step, the starting temperature and the ending temperature in the above main firing step was set to 950° C., and the starting temperature was set to 950° C. and the cooling time was set to 140 min in the above in-furnace cooling step, the mixture was fired under the same conditions as in the above first plate-like particles. The fired mixture was then crushed in a mortar in a dry atmosphere to obtain a Na-containing transition metal oxide ($Na_{0.7}Mn_{0.5}Ni_{0.2}Co_{0.3}O_2$) having a P2-type structure. The Na-containing transition metal oxide was in the form of plate-like particles having an aspect ratio (long diameter/short diameter) of the long diameter to the short diameter of 2.0 or greater in the cross-sectional shape along the thickness direction thereof.

2.3 Spherical P2-Type Particles $Na_2CO_3$ and distilled water were weighed to 1150 g/L and then stirred to complete dissolution using a stirrer to produce a $Na_2CO_3$ aqueous solution. The above precursor particles were mixed into the $Na_2CO_3$ aqueous solution to obtain a slurry. $Na_2CO_3$ and the above precursor particles were mixed so as to have a composition of $Na_{0.7}Mn_{0.5}Ni_{0.2}Co_{0.3}O_2$ after drying. The obtained slurry was dried by spray drying. Specifically, using a spray drying apparatus DL410, under the conditions of a slurry feed rate of 30 mL/min, an inlet temperature of 200° C., a circulating air volume of 0.8 $m^3$/min, and a spraying air pressure of 0.3 MPa, 77% by area of surfaces of the above precursor particles were coated with $Na_2CO_3$ to obtain coated particles.

Figure 7:
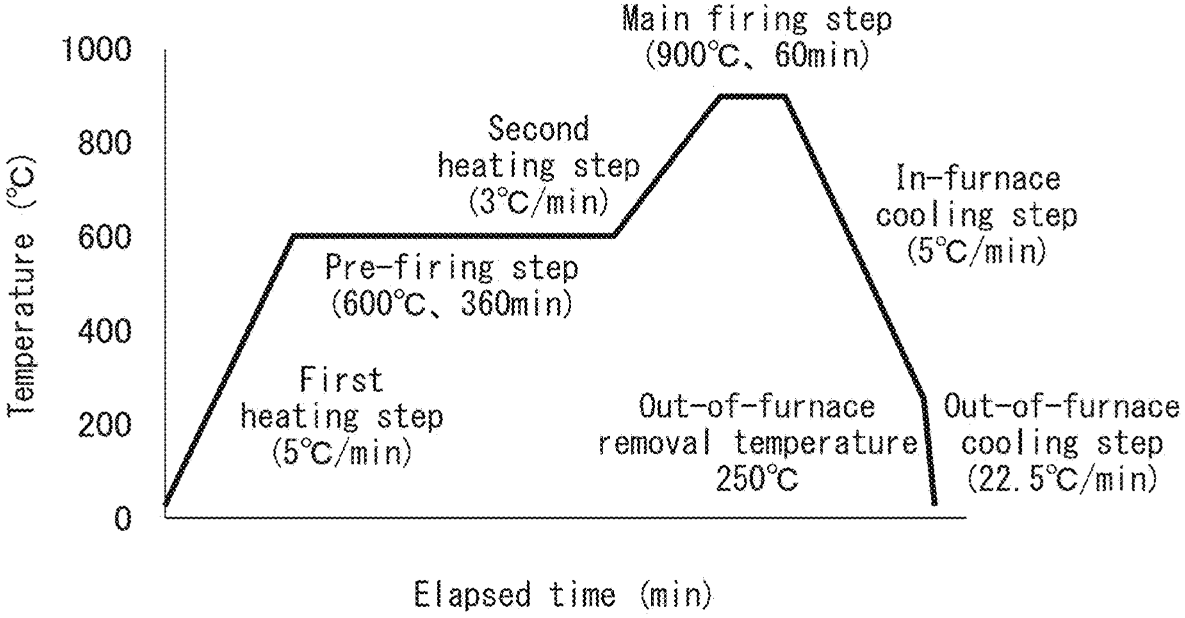
FIG. 7 shows one example of the firing conditions for obtaining a P2-type compound.

An alumina crucible was used for firing of the coated particles in an electric furnace in an ambient air atmosphere. Specifically, the coated particles were subjected to a “first heating step”, a “pre-firing step”, a “second heating step”, a “main firing step”, an “in-furnace cooling step”, and an “out-of-furnace cooling step”, as indicated in Table 2 below and FIG. 7. The fired product was then crushed in a mortar in a dry atmosphere to obtain a Na-containing transition metal oxide ($Na_{0.7}Mn_{0.5}Ni_{0.2}Co_{0.3}O_2$) having a P2-type structure. The Na-containing transition metal oxide was in the form of spherical particles.

TABLE 2

| Step | Starting temperature (° C.) | Ending temperature (° C.) | Time (min) | Heating or cooling rate (° C./min) |
|---|---|---|---|---|
| First heating step | 25 | 600 | 115 | 5 |
| Pre-firing step | 600 | 600 | 360 | 0 |
| Second heating step | 600 | 900 | 100 | 3 |
| Main firing step | 900 | 900 | 60 | 0 |
| In-furnace cooling step | 900 | 250 | 130 | 5 |
| Out-of-furnace cooling step | 250 | 25 | 10 | 22.5 |

3. Production of Active Material Having O2-Type Structure $LiNO_3$ and LiCl were weighed to a molar ratio of 50:50 and mixed with the P2-type plate-like particles or P2-type spherical particles at a molar ratio 10 times the minimum Li amount required for ion exchange to obtain a mixture. An alumina crucible was used to fire the mixture at 280° C. for 1 h in an ambient air atmosphere to obtain a fired product. The fired product was washed off of any salt remaining thereon with pure water and subjected to solid-liquid separation by vacuum filtration to obtain a second precipitate. The second precipitate was dried overnight at 120° C. to obtain positive electrode active material particles having an O2-type structure.

When the first P2-type plate-like particles were used, first O2-type plate-like particles as positive electrode active material particles having an O2-type structure, wherein an aspect ratio (long diameter/short diameter) of the long diameter to the short diameter was 3.1 and the long diameter $D_{1L}$ was 2.9 μm in the cross-sectional shape along the thickness direction thereof, were obtained.

When the second P2-type plate-like particles were used, second O2-type plate-like particles as positive electrode active material particles having an O2-type structure, wherein an aspect ratio (long diameter/short diameter) of the long diameter to the short diameter was 3.2 and the long diameter $D_{1L}$ was 4.1 μm in the cross-sectional shape along the thickness direction thereof, were obtained.

When the spherical P2-type particles were used, spherical O2-type particles as positive electrode active material particles having an O2-type structure, having a circularity of 0.85 and a diameter $D_2$ of 2.3 μm, were obtained.

Figure 8A:
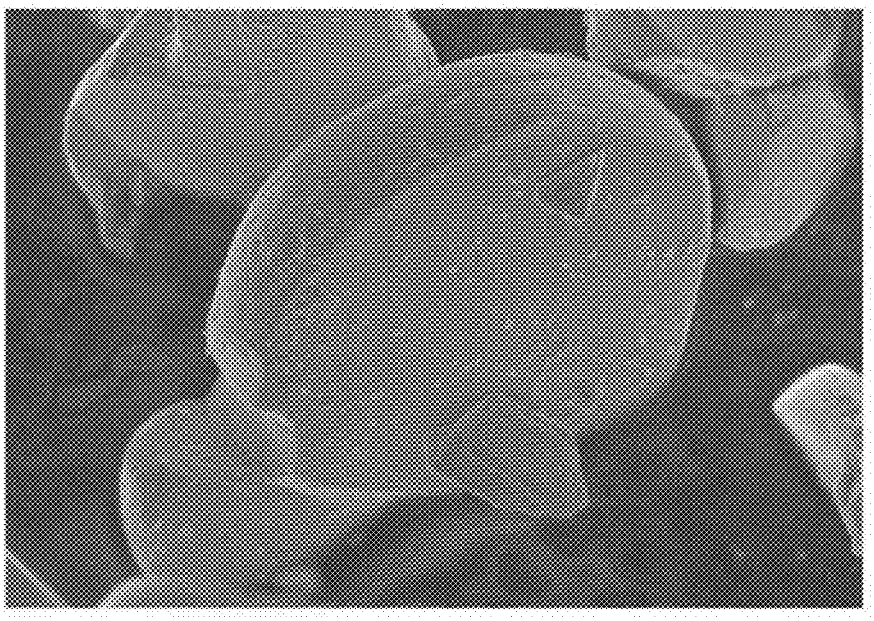
FIG. 8A is a SEM photo diagram of a plate-like O2-type positive electrode active material particle.
Figure 8B:
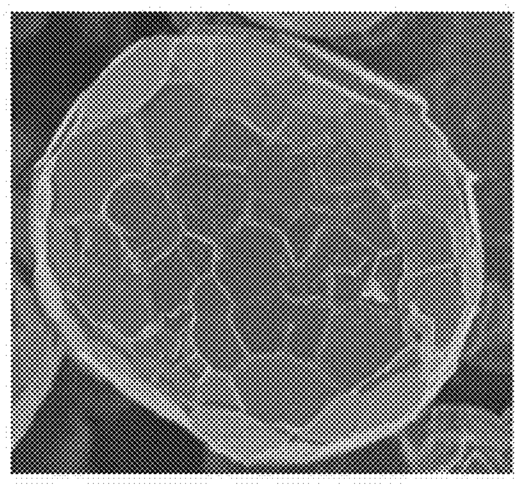
FIG. 8B is a SEM photo diagram of a spherical O2-type positive electrode active material particle.

Each of the plate-like O2-type positive electrode active material particles was substantially composed of one crystallite. However, the surface of each of the spherical O2-type positive electrode active particles was composed of a plurality of crystallites, and the diameter of the crystallites was less than 1 μm. In addition, each of the crystallites had a first surface exposed on the particle surface, and the first surface was planar. Further, elemental analysis confirmed that both of the plate-like O2-type positive electrode active material particles and the spherical O2-type positive electrode active material particles had a chemical composition represented by $Li_{0.63}Mn_{0.5}Ni_{0.2}Co_{0.3}O_2$. FIGS. 8A and 8B show SEM photographs of the exterior of the positive electrode active material particles. FIG. 8A shows a plate-like O2-type positive electrode active material particle, and FIG. 8B shows a spherical O2-type positive electrode active material particle.

4. Production of Evaluation Cell

The above O2-type positive electrode active material particles, a sulfide solid electrolyte A (argyrodite-type sulfide solid electrolyte), PVDF, and VGCF were weighed so as to have a ratio of O2-type positive electrode active material particles: sulfide solid electrolyte A:PVDF:VGCF=82.1:14.9:0.6:2.4 (mass ratio) and mixed to obtain a positive electrode mixture. A negative electrode active material ($Li_{15}Si_4$ and elemental Si), a sulfide solid electrolyte B ($Li_2S$—$P2S_5$—LiI—LiBr), PVDF, and VGCF were weighed so as to have a ratio of $Li_{15}S_4$:elemental Si:sulfide solid electrolyte B:PVDF:VGCF=30.5:50.7:15.5:0.9:2.4 (mass ratio) and mixed to obtain a negative electrode mixture. The sulfide solid electrolyte B and acrylate-butadiene rubber (ABR) were weighed so as to have a ratio of sulfide solid electrolyte B:ABR=99.4:0.6 (mass ratio) and mixed to obtain an electrolyte mixture. The above electrolyte mixture was placed in a Macor cylinder and pressed at 9.8 kN for 1 min to form an electrolyte layer. The above positive electrode mixture was then placed on one side of the electrolyte layer and pressed at 19.6 kN for 1 min to form a positive electrode active material layer. Further, the above negative electrode mixture was then placed on the other side of the electrolyte layer and pressed at 58 kN for 3 min to form a negative electrode active material layer. Finally, current collectors were arranged on both sides in the laminating direction of the above layers to obtain an evaluation cell.

2.1 Example 1

The first O2-type plate-like particles and the spherical O2-type particles, which were mixed so as to have a ratio of plate-like:spherical=80:20 (mass ratio), were used as the O2-type positive electrode active material. The ratio $D_{1L}/D_2$ of the long diameter $D_{1L}$ of the first O2-type plate-like particles to the diameter $D_2$ of the spherical O2-type particles was 1.26.

2.2 Example 2

The first O2-type plate-like particles and the spherical O2-type particles, which were mixed so as to have a ratio of plate-like:spherical=20:80 (mass ratio), were used as the O2-type positive electrode active material. The ratio $D_{1L}/D_2$ of the long diameter $D_{1L}$ of the first O2-type plate-like particles to the diameter $D_2$ of the spherical O2-type particles was 1.26.

2.3 Comparative Example 1

The second O2-type plate-like particles and the spherical O2-type particles, which were mixed so as to have a ratio of plate-like:spherical=80:20 (mass ratio), were used as the O2-type positive electrode active material. The ratio $D_{1L}/D_2$ of the long diameter $D_{1L}$ of the second O2-type plate-like particles to the diameter $D_2$ of the spherical O2-type particles was 1.78.

2.4 Comparative Example 2

Only the spherical O2-type particles were used as the O2-type positive electrode active material.

2.5 Comparative Example 3

Only the first O2-type plate-like particles were used as the O2-type positive electrode active material.

3. Evaluation Conditions

The above evaluation cell was charged and discharged at a voltage range of 1.8 to 4.6 V at a 0.1 C rate (1 C=220 mA/g) in an isothermal chamber maintained at 25° C., and the discharging capacity was measured. The results are shown in Table 3 below and FIG. 9.

TABLE 3

| | Plate-like particle ratio (% by mass) | $D_{1L}/D_2$ | Discharging capacity (mAh/g) |
|---|---|---|---|
| Example 1 | 80 | 1.26 | 217 |
| Example 2 | 20 | 1.26 | 209 |
| Comparative Example 1 | 80 | 1.78 | 208 |
| Comparative Example 2 | 0 | — | 206 |
| Comparative Example 3 | 100 | — | 215 |

4. Cross-Sectional Observation

The positive electrode active material layer of the evaluation cell was observed with SEM in a cross-section along the thickness direction of the layer. The results are shown in FIGS. 10A to E.

5. Evaluation Results

Figure 9:
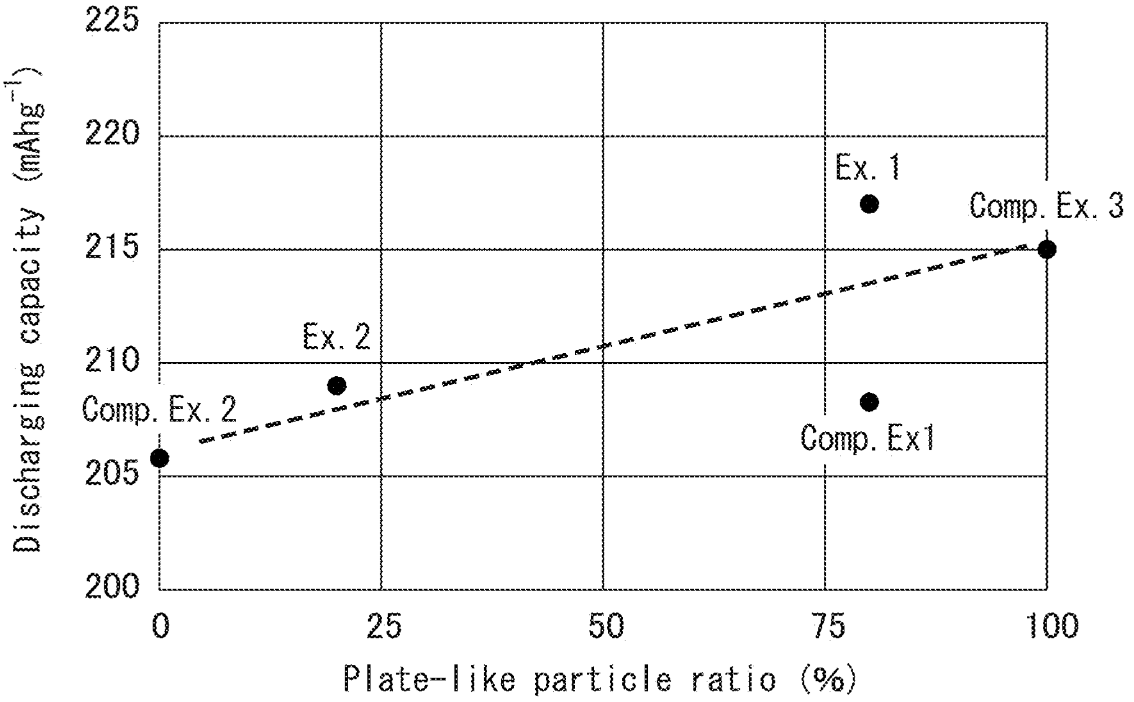
FIG. 9 shows a relationship between plate-like particle ratio and discharging capacity.
Figure 10A:
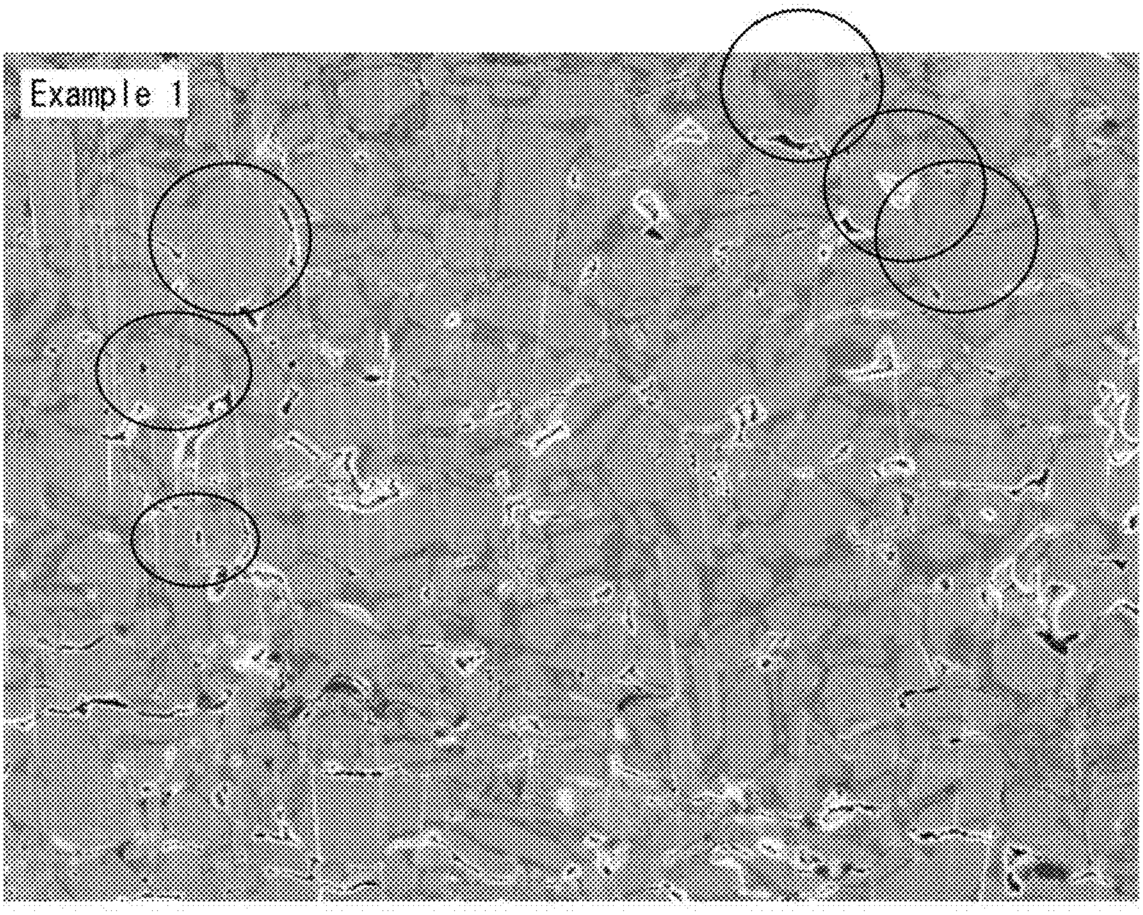
FIG. 10A is a cross-sectional SEM photo diagram of a positive electrode active material layer of the evaluation cell according to Example 1.
Figure 10B:
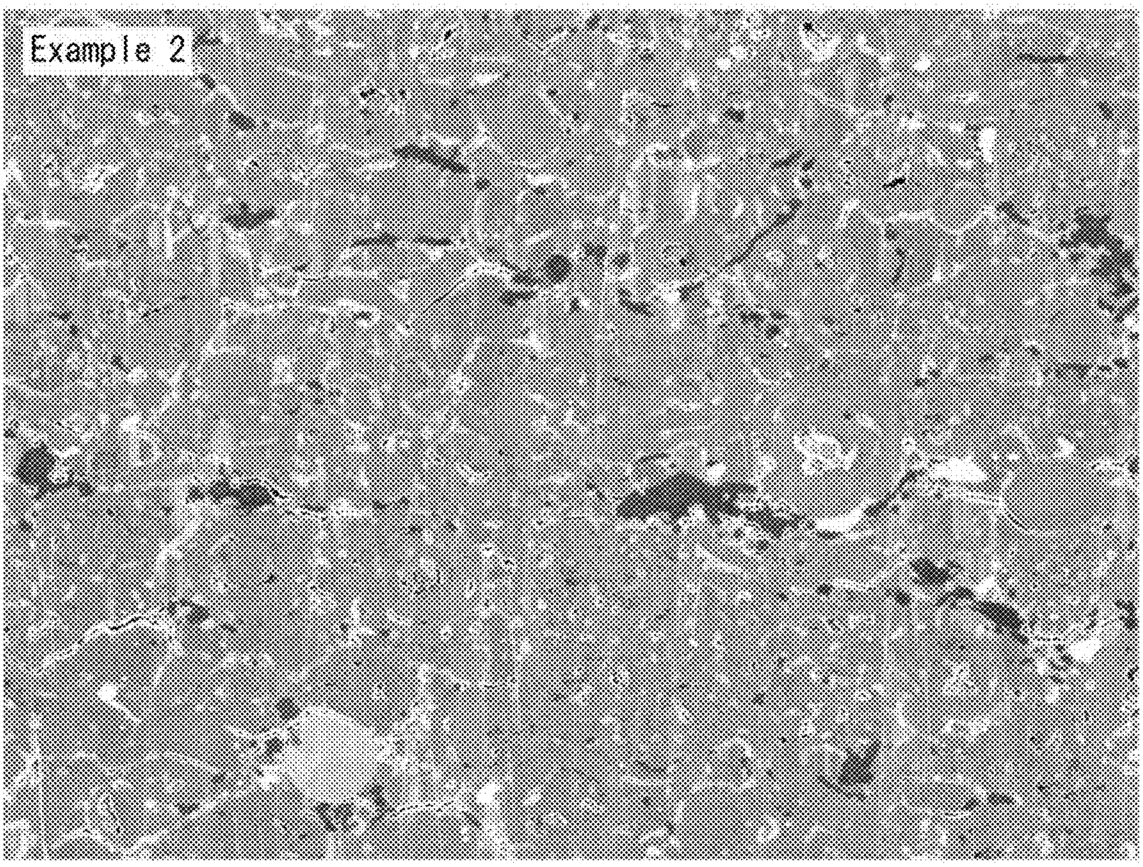
FIG. 10B is a cross-sectional SEM photo diagram of a positive electrode active material layer of the evaluation cell according to Example 2.
Figure 10C:
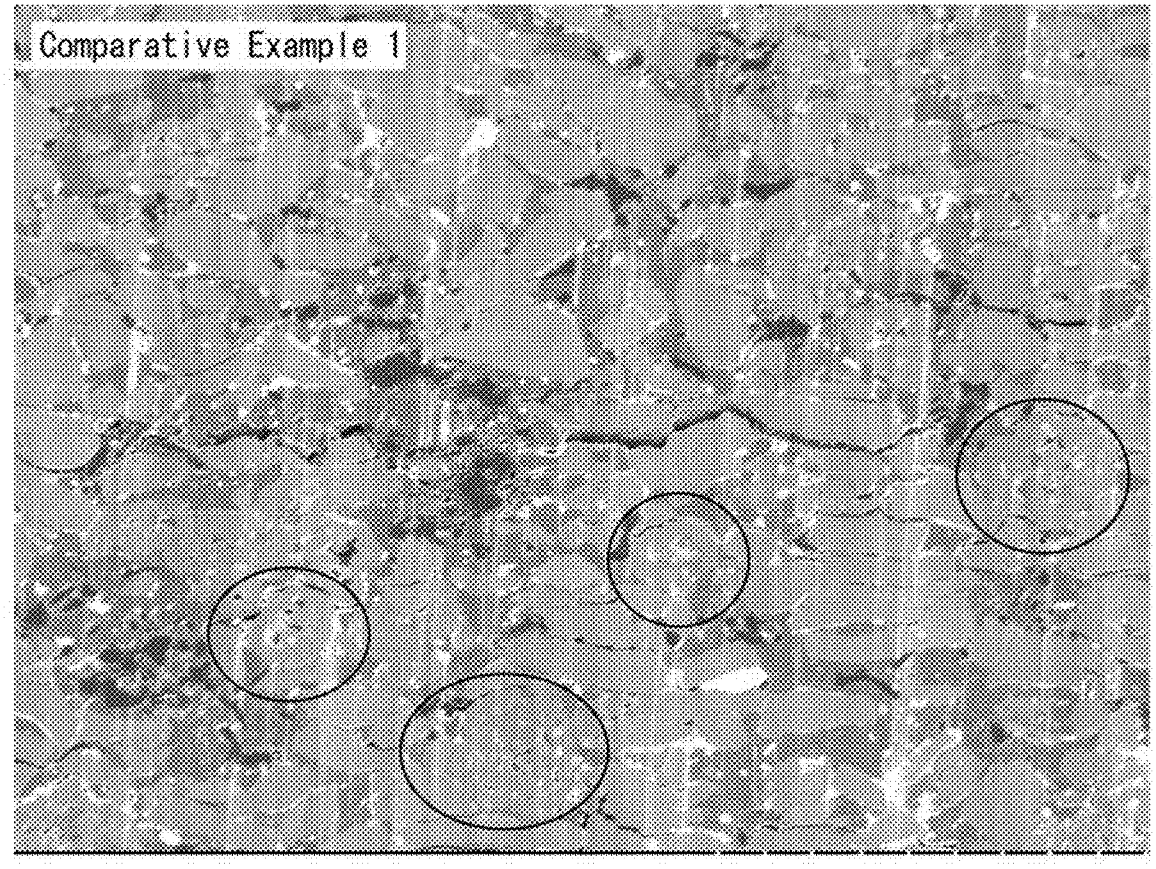
FIG. 10C is a cross-sectional SEM photo diagram of a positive electrode active material layer of the evaluation cell according to Comparative Example 1.
Figure 10D:
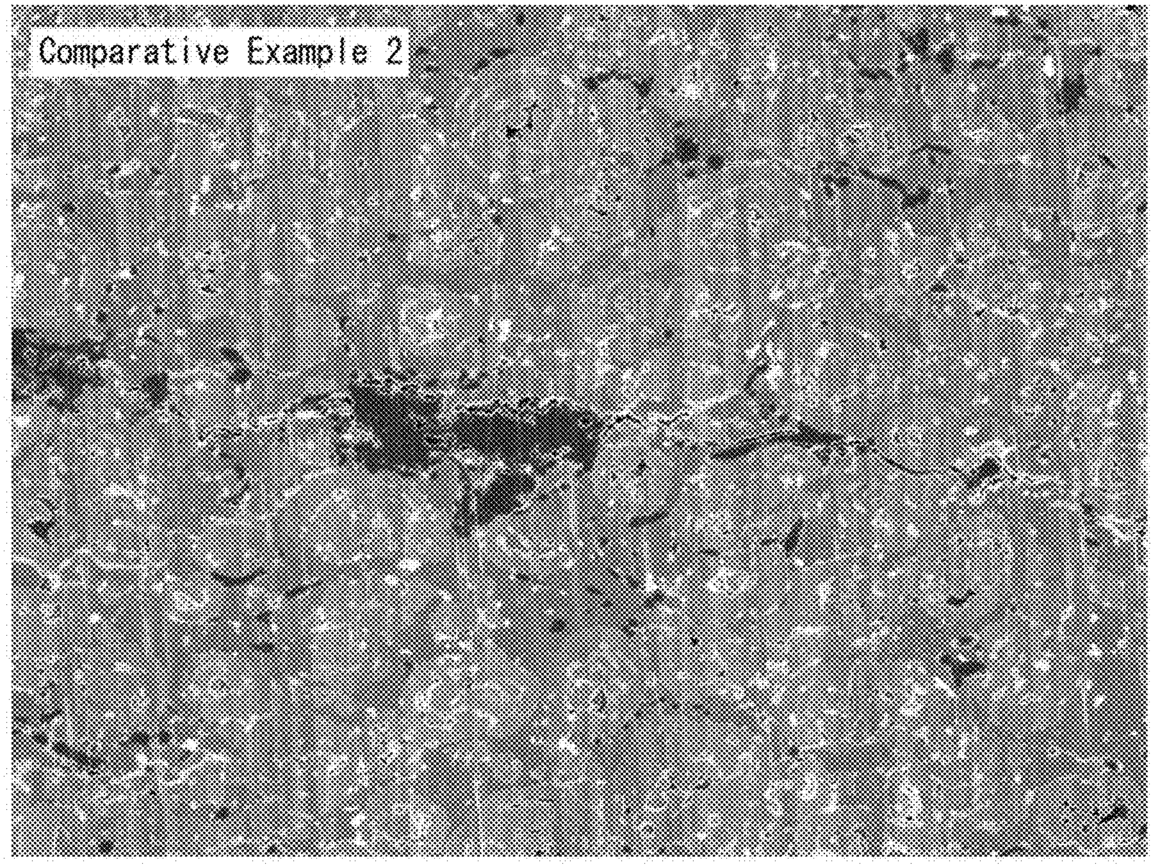
FIG. 10D is a cross-sectional SEM photo diagram of a positive electrode active material layer of the evaluation cell according to Comparative Example 2.
Figure 10E:
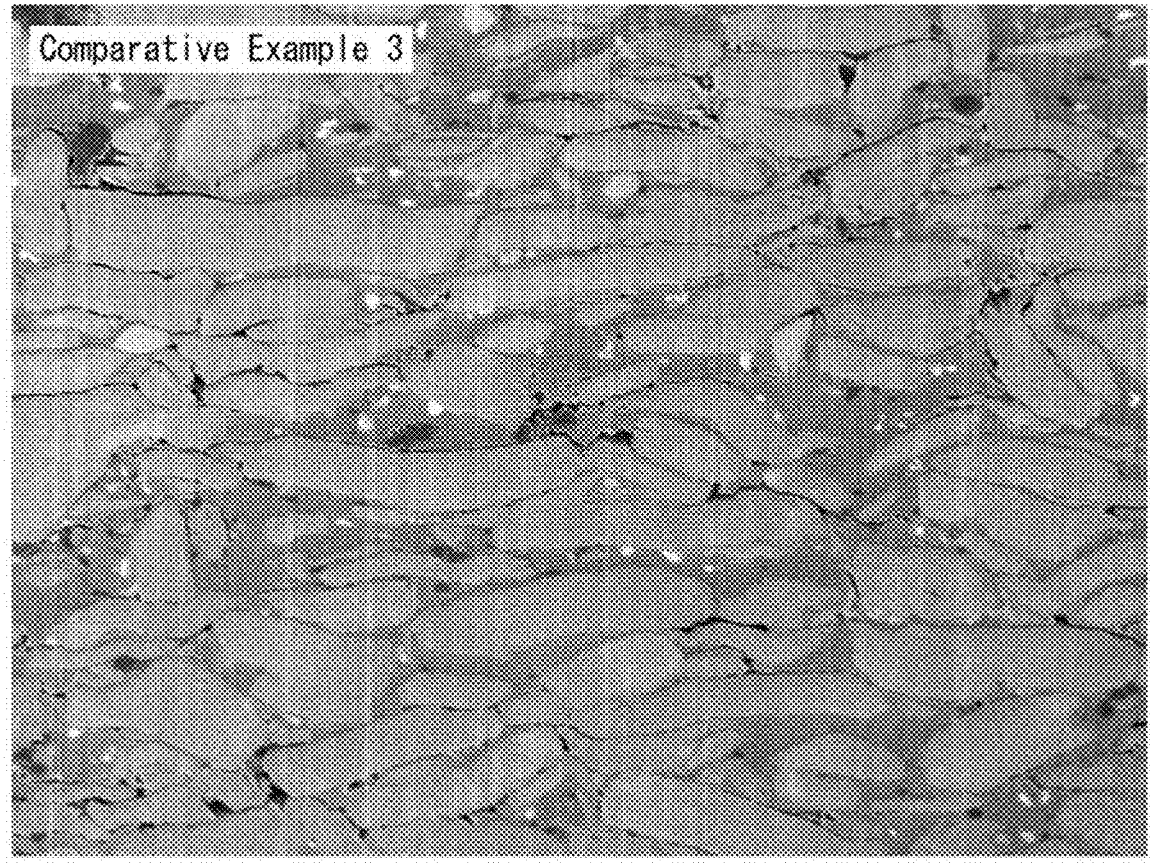
FIG. 10E is a cross-sectional SEM photo diagram of a positive electrode active material layer of the evaluation cell according to Comparative Example 3.

As shown in Table 2 and FIG. 9, high discharging capacities were obtained in the cells according to Examples 1 and 2. Particularly, the cell according to Example 1 had a remarkably high discharging capacity. This is considered to be due to the following mechanism. First, a plate-like O2-type active material (first active material) has entrances and exits for intercalation at the ends thereof. Thus, when forming a positive electrode active material layer using a plate-like O2-type active material, it is preferable that plate surfaces of the plate-like O2-type active material in the positive electrode active material layer intersect (preferably perpendicularly intersect) the surface direction of the positive electrode active material layer. However, when the positive electrode active material layer was constituted using only a plate-like O2-type active material as the positive electrode active material, plate surfaces of the plate-like O2-type active material ran along the surface direction of the positive electrode (FIG. 10E, Comparative Example 3). Thus, capacity was easily decreased due to an increase in degree of curvature and a decrease in utilization rate of the plate-like O2-type active material. Even when a spherical O2-type active material was used with the plate-like O2-type active material, when the size of the spherical O2-type active material was small ($D_{1L}/D_2$ was greater than 1.5), the problem was not eliminated (FIG. 10C, Comparative Example 1). On the other hand, when a spherical O2-type active material was used with the plate-like O2-type active material and the size of the spherical O2-type active material was large ($D_{1L}/D_2$ was 1.5 or less), the plate-like O2-type active material could be raised by the spherical O2-type active material, and orientation of plate surfaces of the plate-like O2-type active material was easily randomized (FIGS. 10A and B, Examples 1 and 2). Specifically, it is considered that the amount of plate-like O2-type active material intersecting the surface direction of the positive electrode active material layer was increased, and capacity was increased by a decrease in degree of curvature and an increase in utilization rate of plate-like O2-type active material. In addition, it is considered that the spherical O2-type active material itself could also contribute to capacity improvement, and as a result, capacity was further increased.

6. Supplemental

Note that, although positive electrode active material particles having a specific chemical composition were exemplified in the above Examples, the chemical composition of the positive electrode active material particle of the present disclosure is not limited thereto. However, according to the findings of the present inventors, when at least one of Mn, Ni, and Co is included as a transition metal, the P2-type structure crystallizes in a specific direction to become plate-like, and the finally obtained O2-type particles are easily plate-like. It is said that the problem to be solved by the technique of the present disclosure is particularly significant when at least one of Mn, Ni, and Co is included as a transition metal.

7. Summary

From the above Examples, when a positive electrode mixture having the following features (1) to (5) is used to configure a positive electrode active material layer of a lithium-ion battery, the capacity of the lithium-ion battery is easily improved.

(1) The positive electrode mixture comprises a first active material and a second active material.

(2) The first active material has an O2-type structure and is plate-like.

(3) The second active material has an O2-type structure and is spherical.

(4) A ratio $D_{1L}/D_2$ of a long diameter $D_{1L}$ of the first active material to a diameter $D_2$ of the second active material is 0.1 or greater and 1.5 or less.

(5) A ratio of the first active material relative to a total of the first active material and the second active material is 10% by mass or greater and 90% by mass or less.

REFERENCE SIGNS LIST

1 positive electrode mixture
1*a* first active material
1*b* second active material
100 lithium-ion battery
10 positive electrode current collector
20 positive electrode active material layer
30 electrolyte layer
40 negative electrode active material layer
50 negative electrode current collector

The invention claimed is:

1. A positive electrode mixture, comprising a first active material and a second active material, wherein the first active material has an O2-type structure and is plate-like, the second active material has an O2-type structure and is spherical, a ratio $D_{1L}/D_2$ of a long diameter $D_{1L}$ of the first active material to a diameter $D_2$ of the second active material is 0.1 or greater and 1.5 or less, and a ratio of the first active material relative to a total of the first active material and the second active material is 10% by mass or greater and 90% by mass or less.

2. The positive electrode mixture according to claim 1, wherein a surface of the second active material comprises a plurality of crystallites.

3. The positive electrode mixture according to claim 1, comprising a solid electrolyte.

4. The positive electrode mixture according to claim 1, comprising one or both of a conductive aid and a binder.

5. A lithium-ion battery, comprising a positive electrode active material layer, an electrolyte layer, and a negative electrode active material layer, wherein the positive electrode active material layer comprises the positive electrode mixture according to claim 1.

6. The lithium-ion battery according to claim 5, wherein one or both of the electrolyte layer and the negative electrode active material layer comprise a solid electrolyte.

7. A manufacturing method for a lithium-ion battery, comprising using the positive electrode mixture according to claim 1 to obtain a positive electrode active material layer, and using the positive electrode active material layer, an electrolyte layer, and a negative electrode active material layer to obtain a lithium-ion battery.

* * * * *